United States Patent
Ahn et al.

(10) Patent No.: US 12,260,164 B2
(45) Date of Patent: Mar. 25, 2025

(54) METHOD FOR DESIGNING PATTERN LAYOUT INCLUDING OBLIQUE EDGES AND METHOD FOR MANUFACTURING SEMICONDUCTOR DEVICE USING THE SAME

(71) Applicant: SAMSUNG ELECTRONICS CO., LTD., Suwon-si (KR)

(72) Inventors: Hungbae Ahn, Hwaseong-si (KR); Sangoh Park, Hwaseong-si (KR); Jinho Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 594 days.

(21) Appl. No.: 17/703,338

(22) Filed: Mar. 24, 2022

(65) Prior Publication Data

US 2023/0054175 A1 Feb. 23, 2023

(30) Foreign Application Priority Data

Aug. 20, 2021 (KR) .................. 10-2021-0110212

(51) Int. Cl.
*G06F 30/30* (2020.01)
*G06F 30/392* (2020.01)
*G06F 30/398* (2020.01)
*G06F 119/18* (2020.01)

(52) U.S. Cl.
CPC .......... *G06F 30/392* (2020.01); *G06F 30/398* (2020.01); *G06F 2119/18* (2020.01)

(58) Field of Classification Search
None
See application file for complete search history.

(56) References Cited

U.S. PATENT DOCUMENTS

| | | | | |
|---|---|---|---|---|
| 6,801,823 | B2 * | 10/2004 | Mori | G06Q 10/087 700/121 |
| 7,155,698 | B1 * | 12/2006 | Gennari | G06T 7/0004 716/53 |
| 9,053,287 | B1 * | 6/2015 | Acosta | G06F 30/398 |
| 11,669,669 | B2 * | 6/2023 | Lin | H01L 27/0207 716/119 |
| 2004/0205688 | A1 | 10/2004 | Pierrat | |
| 2005/0097501 | A1 | 5/2005 | Cobb et al. | |

(Continued)

FOREIGN PATENT DOCUMENTS

KR 10-0732772 B1 6/2007
KR 10-2011-0076505 A 7/2011
KR 10-2021-0045265 A 4/2021

*Primary Examiner* — Jack Chiang
*Assistant Examiner* — Brandon Bowers
(74) *Attorney, Agent, or Firm* — Muir Patent Law, PLLC

(57) ABSTRACT

A pattern layout design method includes performing optical proximity correction (OPC) for a mask layout, thereby creating a corrected layout. Creation of the corrected layout includes creating a first corrected layout through grid snapping for an oblique edge of a mask layout designed on a grid layout, and performing optical proximity correction (OPC) for the first corrected layout, thereby creating a second corrected layout. Creation of the first corrected layout includes creating a first divisional point for the oblique edge or a residual edge, and shifting the first divisional point to one of four reference points adjacent to the first divisional point, thereby creating a first varied divisional point.

20 Claims, 19 Drawing Sheets

(56) References Cited

U.S. PATENT DOCUMENTS

| | | |
|---|---|---|
| 2007/0074142 A1 | 3/2007 | Smayling et al. |
| 2007/0248893 A1 | 10/2007 | Kang et al. |
| 2010/0175041 A1 | 7/2010 | Krasnoperova et al. |
| 2015/0125063 A1 | 5/2015 | Hsieh et al. |
| 2018/0149967 A1 | 5/2018 | Lai et al. |
| 2019/0266311 A1 | 8/2019 | Abouelseoud et al. |
| 2021/0109437 A1 | 4/2021 | Oh et al. |

\* cited by examiner

METHOD FOR DESIGNING PATTERN LAYOUT INCLUDING OBLIQUE EDGES AND METHOD FOR MANUFACTURING SEMICONDUCTOR DEVICE USING THE SAME

CROSS-REFERENCE TO THE RELATED APPLICATION

This application claims priority from Korean Patent Application No. 10-2021-0110212 filed on Aug. 20, 2021, in the Korean Intellectual Property Office, the disclosure of which is incorporated herein by reference in its entirety.

BACKGROUND

1. Field

Embodiments relate to a pattern layout design method using optical proximity correction and a method for manufacturing a semiconductor device using the same.

2. Description of the Related Art

A photolithography process may be performed using a reticle on which a layout of a pattern is drawn. The photolithography process may include an exposure process for transferring the layout of the pattern to a photoresist film. When the layout of the pattern is transferred in the exposure process, the layout of the pattern may be transferred in a state of being deformed due to an optical effect and, as such, a pattern different in shape from the pattern layout drawn on the reticle may be formed. To this end, the pattern layout may be designed, taking into consideration deformation of the pattern layout in the exposure process, and, as such, optical proximity correction (hereinafter referred to as "OPC") may be performed before fabrication of a reticle.

SUMMARY

A pattern layout design method according to an embodiment may include creating a first corrected layout through grid snapping for an oblique edge of a mask layout designed on a grid layout, and performing optical proximity correction (OPC) for the first corrected layout, thereby creating a second corrected layout, wherein the creating the first corrected layout may include creating a first divisional point dividing the oblique edge, discriminating whether or not the first divisional point overlaps with one of reference points, grid-snapping the first divisional point when the first divisional point does not overlap with any one of the reference points, thereby creating a first correction edge and a first residual edge, discriminating whether or not a number of created divisional points corresponds to a predetermined number, creating a second divisional point dividing the first residual edge when the number of created divisional points does not correspond to the predetermined number, discriminating whether or not the second divisional point overlaps with one of the reference points, and grid-snapping the second divisional point when the second divisional point does not overlap with any one of the reference points, thereby creating a second correction edge and a second residual edge.

A pattern layout design method according to an embodiment may include creating a first corrected layout through grid snapping for an oblique edge of a mask layout designed on a grid layout, and performing optical proximity correction (OPC) for the first corrected layout, thereby creating a second corrected layout, wherein the creating the first corrected layout may include creating a divisional point dividing the oblique edge, discriminating whether or not the divisional point overlaps with one of reference points, creating a correction edge and a residual edge in accordance with whether or not the divisional point overlaps with one of the reference points, and repeating creating a divisional point dividing a residual edge, discriminating whether or not the divisional point dividing the residual edge overlaps with one of the reference points, and creating a correction edge and a residual edge in accordance with whether or not the divisional point dividing the residual edge overlaps with one of the reference point, until a number of created divisional points corresponds to a predetermined number, wherein the creating the correction edge and the residual edge may include connecting four reference points adjacent to the divisional point to a start point of the oblique edge, respectively, thereby creating first to fourth preliminary lines, when the divisional point does not overlap with any one of the reference points, calculating angles respectively formed by the oblique edge with respect to the first to fourth preliminary lines, and shifting the divisional point to the reference point of the preliminary line, which forms a smallest angle with respect to the oblique edge, from among the four reference points.

A semiconductor device manufacturing method according to an embodiment may include designing a mask layout, performing optical proximity correction (OPC) for the mask layout, thereby creating a corrected layout, fabricating a mask using the corrected layout, and manufacturing a semiconductor device using the mask, wherein the creating the corrected layout may include creating a first corrected layout through grid snapping for an oblique edge of a mask layout designed on a grid layout, and performing optical proximity correction (OPC) for the first corrected layout, thereby creating a second corrected layout, wherein the creating the first corrected layout may include creating a first divisional point for the oblique edge or a residual edge, and shifting the first divisional point to one of four reference points adjacent to the first divisional point, thereby creating a first varied divisional point.

BRIEF DESCRIPTION OF THE DRAWINGS

Features will become apparent to those of skill in the art by describing in detail example embodiments with reference to the attached drawings in which.

DETAILED DESCRIPTION

Figure 1:
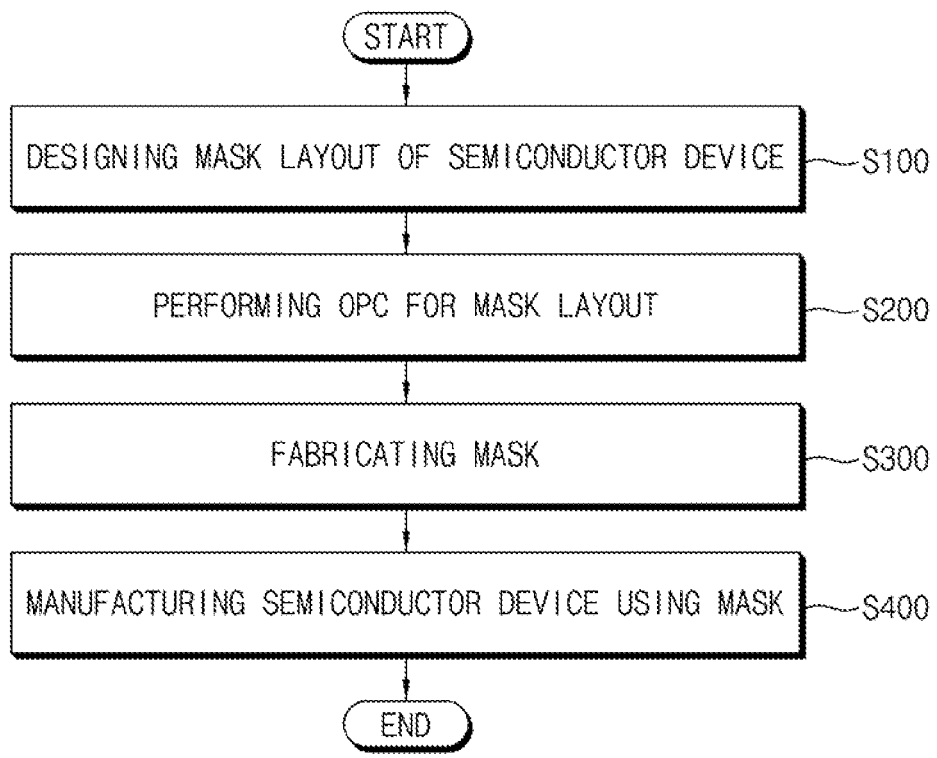
FIG. 1 is a flowchart showing a method for manufacturing a semiconductor device in accordance with an example embodiment.

FIG. 1 is a flowchart showing a method for manufacturing a semiconductor device in accordance with an example embodiment.

Referring to FIG. 1, the semiconductor device manufacturing method may include designing a mask layout of a semiconductor device (S100), performing optical proximity correction (OPC) for the mask layout (S200), fabricating a mask using the corrected mask layout (S300), and manufacturing the semiconductor device using the mask (S400).

Designing the mask layout of the semiconductor device (S100) may include providing a mask layout corresponding to a circuit pattern of the semiconductor device, which is to be formed on a wafer, from a host computer of semiconductor manufacturing equipment or a server.

The mask layout may be a physical representation enabling a circuit designed for the semiconductor device to be transferred onto a wafer, and may include a plurality of patterns. For example, the patterns may include repetitive patterns having the same shape, and may be provided in the form of a combination of polygons such as triangles and/or quadrangles. For example, the mask layout may be provided from a CAD system as coordinate values of profiles of patterns constituting the mask layout. The mask layout may be represented in the form of a vector graphics format on a grid layout including reference points arranged in the form of a grid (for example, provided by a computer program such as a CAD system).

In general, in an overall lithography process, an error may be generated if patterns of the mask layout are incorrectly transferred onto a wafer, e.g., due to various optical effects including an optical proximity effect. Performing optical proximity correction (OPC) for the mask layout (S200) means correction for varying the patterns included in the mask layout by reflecting the error.

Performing optical proximity correction (OPC) may include estimating, from the mask layout, an image to be formed on the wafer, and correcting the mask layout on the basis of results of the estimation. As an example, optical proximity correction (OPC) may include increasing the entire size of the patterns constituting the mask layout, and processing a corner portion of each pattern. As another example, optical proximity correction (OPC) may include shifting edges of each pattern or adding additional polygons. A distortion phenomenon of a pattern caused by diffraction, interference, etc., of light occurring during exposure and an error caused by a pattern density may be corrected via optical proximity correction (OPC).

In the present example embodiment, optical proximity correction (OPC) uses a method of shifting edges of a pattern, and aspects of performing optical proximity correction (OPC) for the mask layout (S200) are described below in detail. In an example embodiment, the pattern layout design method may represent designing the mask layout (S100), and performing optical proximity correction (OPC) for the mask layout (S200).

Fabricating the mask using the corrected mask layout (S300) may include forming a mask, e.g., a physical mask for lithography, by performing exposure, development, etching, cleaning, and baking processes, etc., on a mask substrate using the corrected mask layout.

For example, fabricating the mask may include providing a blank mask that is formed with a metal film and a photoresist film on a quartz substrate thereof, performing an exposure process on the photoresist film of the blank mask using the corrected mask layout, performing a development process on the photoresist film to form photoresist film patterns including patterns corresponding to the corrected mask layout, and etching the metal film of the blank mask using the photoresist film patterns as an etch mask.

Manufacturing the semiconductor device using the mask (S400) may include performing a lithography process using the mask. The semiconductor device may be finally manufactured by further performing deposition, etching, ion implantation and cleaning processes, etc. in addition to the lithography process. The semiconductor device may include a volatile memory such as a dynamic random access memory (DRAM), a static random access memory (SRAM), etc., or a non-volatile memory such as a flash memory, and may include a logic semiconductor device such as a microprocessor, for example, a central processing unit (CPU), a controller, an application specific integrated circuit (ASIC), etc.

Figure 2:
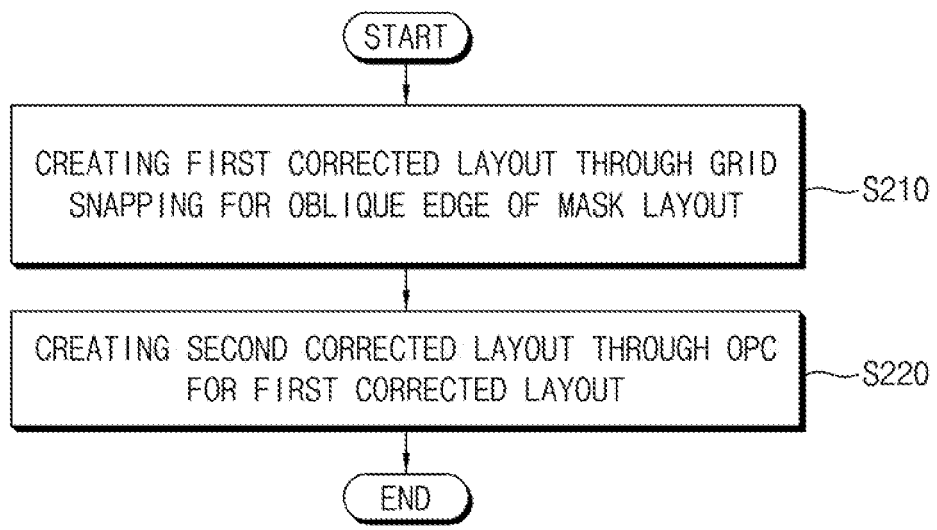
FIG. 2 is a flowchart explaining operation S200 of FIG. 1.
Figure 3:
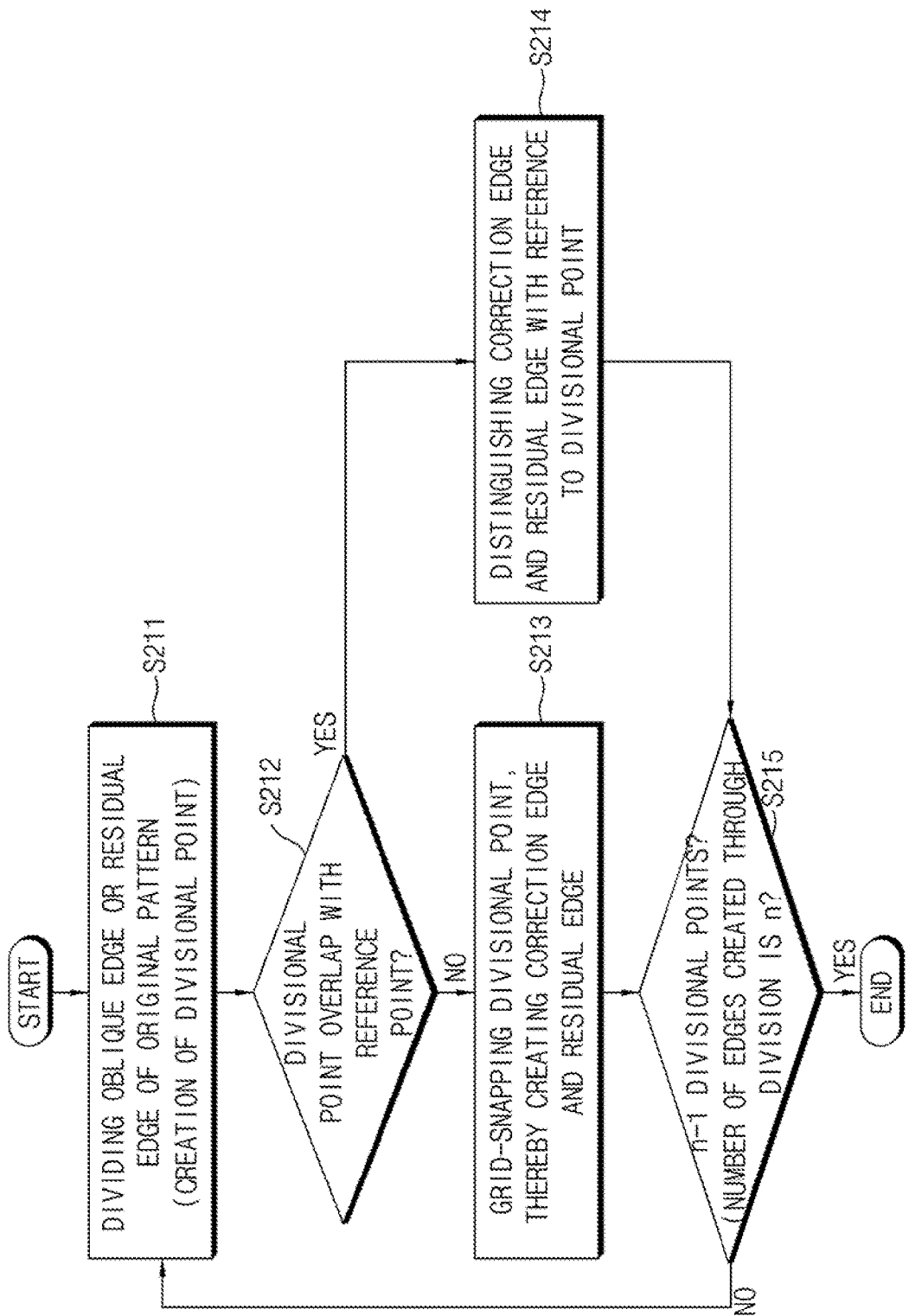
FIG. 3 is a flowchart explaining operation S210 of FIG. 2.
Figure 4:
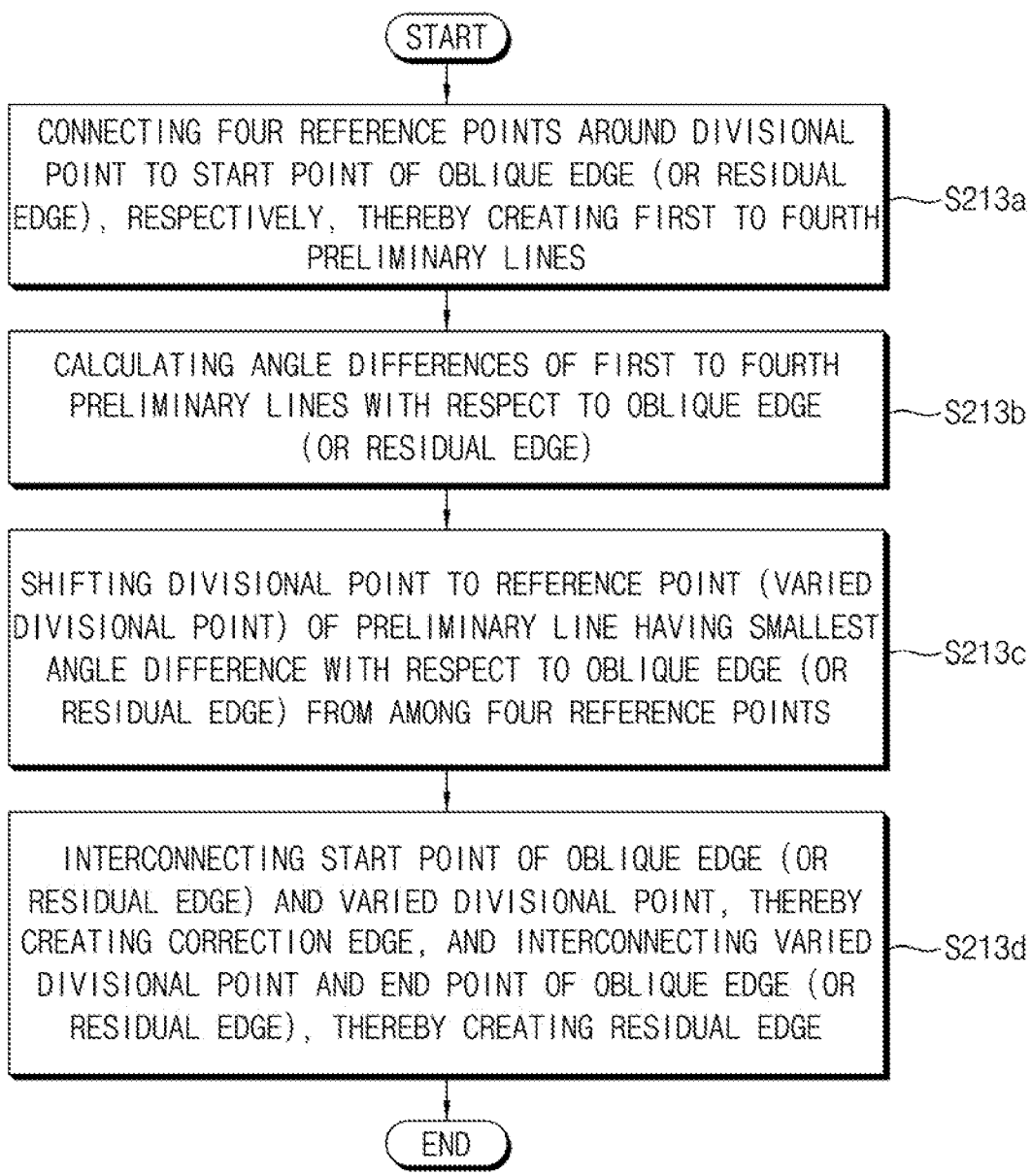
FIG. 4 is a flowchart explaining operation S213 of FIG. 3.

FIG. 2 is a flowchart explaining operation S200 of FIG. 1.
FIG. 3 is a flowchart explaining operation S210 of FIG. 2.
FIG. 4 is a flowchart explaining operation S213 of FIG. 3.
FIGS. 5 to 13 are concept diagrams explaining operations of FIGS. 3 and 4.

Referring to FIGS. 1 and 2, performing optical proximity correction (OPC) for the mask layout (S200) may include creating a first corrected layout through grid snapping for an oblique edge of the mask pattern (S210), and creating a second corrected layout through optical proximity correction (OPC) for the first corrected layout (S220).

Aspects of creating the first corrected layout, and the grid snapping, according to the present example embodiment will now be described in connection with FIGS. 1, 2, and 5.

The performing of the optical proximity correction (OPC) for the mask layout according to the present example embodiment may use a method of shifting edges of an original pattern included in the mask layout.

Figure 5:
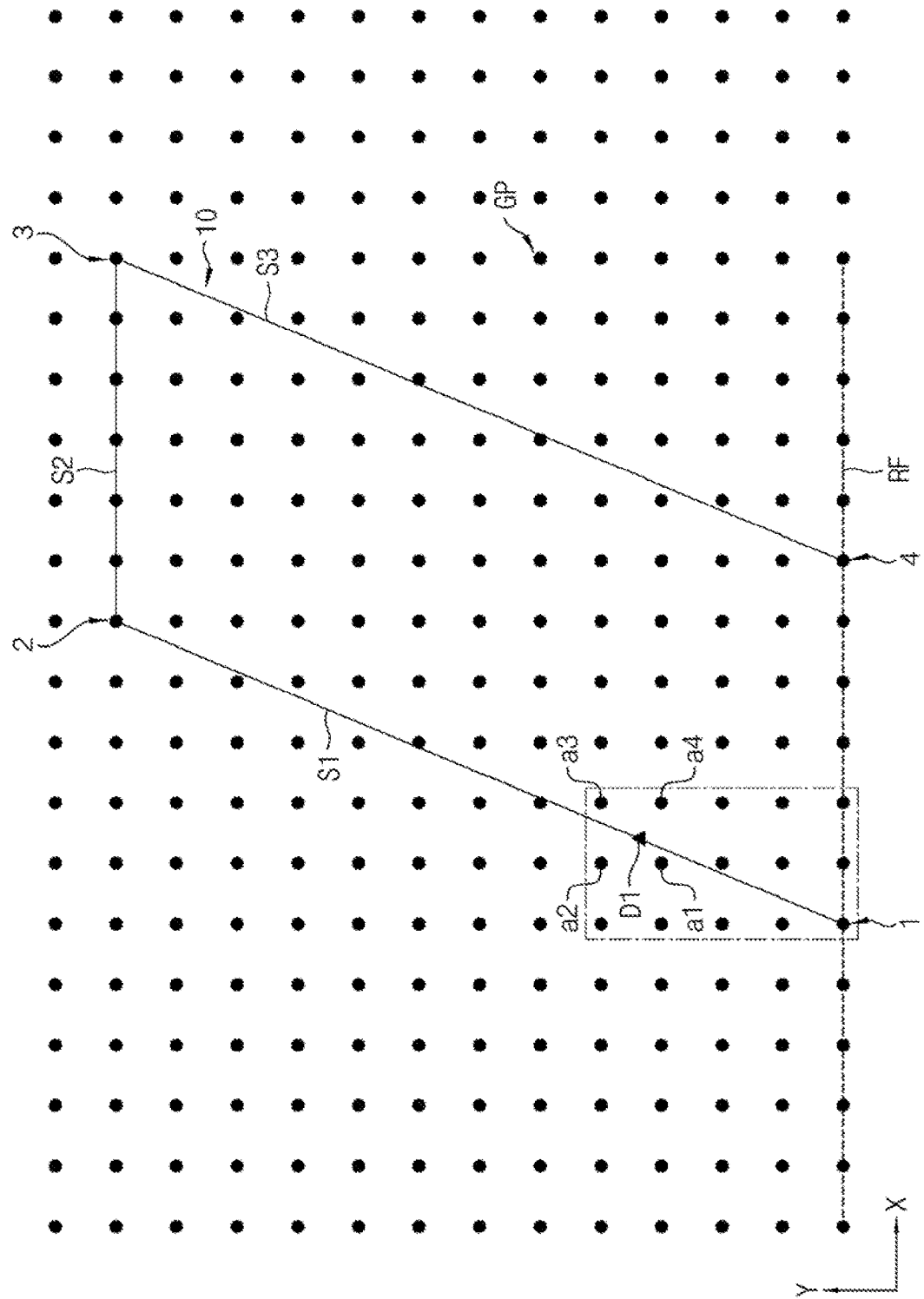
FIGS. 5 to 13 are concept diagrams explaining operations of FIGS. 3 and 4.

Referring to FIG. 5, the original pattern included in the mask layout may be provided on a grid layout including a plurality of reference points GP that are arranged in the form of a grid.

Vertexes of the original pattern may be disposed on the reference points GP. As such, opposite ends of the edges constituting the original pattern may be disposed on the reference points GP.

In further detail, FIG. 5 illustrates an example of an original pattern 10 provided on the grid layout. Note that FIG. 5 shows only a portion (an upper portion) of the original pattern 10 provided on the grid layout.

The original pattern 10 may include a first edge S1, a second edge S2, and a third edge S3. The original pattern 10 may include a first vertex 1, a second vertex 2, a third vertex 3, and a fourth vertex 4. All of the first to fourth vertexes 1, 2, 3 and 4 of the original pattern 10 may be disposed on reference points GP.

Referring to FIG. 5, the reference points GP may be arranged in a grid and spaced apart from one another in a first direction X and a second direction Y. The first direction X and the second direction Y may be perpendicular to each other in the same plane.

In an example embodiment, the reference points GP may be spaced apart from one another in the first direction X and the second direction Y by a uniform spacing. In an example embodiment, the spacing of the reference points GP may vary in accordance with the size of the original pattern 10.

Referring to FIG. 5, a reference line RF may be defined to pass through ones of the reference points GP while extending in the first direction X.

Referring to FIG. 5, a divisional point D1 may be defined for an edge, e.g., the first edge S1.

Referring to FIG. 5, among the plurality of reference points GP, a set of four reference points GP (including a first reference point a1, a second reference point a2, a third reference point a3, and a fourth reference point a4) may be selected adjacent to, e.g., bounding, the first divisional point D1.

In the present example embodiment, shifting of edges for optical proximity correction (OPC) may not be achieved by shifting the entirety of each of the edges constituting the original pattern, but instead may be achieved by dividing each edge into several segments, and then shifting the segments. The divided segments may have the same length.

In the division of edges, divisional points may or may not align with the reference points GP, depending on an angle formed relative to the reference line RF. This will now be explained for a first case, in which divisional points align with the reference points GP, and a second case, which divisional points do no not align for oblique edges.

In the first case of division of edges, for edges that form 0 degrees or 90 degrees with respect to the reference line RF, or that form 45 degrees with reference to the reference line RF, several segments may be formed by forming, on the reference points GP, divisional points for division of the edges. Accordingly, opposite ends of the segments may be disposed on the reference points GP and, as such, shifting of the segments for optical proximity correction (OPC) may be achieved by shifting positions of the opposite ends of the segments (or positions of the divisional points) from the reference points GP at which the opposite ends are positioned (or the reference points GP at which the divisional points are positioned) to other reference points GP.

On the other hand, in the second case of division of edges, for an oblique edge (i.e., an edge that does not form 0 degrees, 45 degrees, or 90 degrees with respect to the reference line) (hereinafter simply referred to as "an oblique edge), at least one of divisional points for division of the oblique edge may not be positioned on the reference points GP. In this case, segment shifting (for example, on a computer program) may not be possible. In this case, performing optical proximity correction (OPC) for the mask layout (S200) may include performing grid snapping for an oblique edge when the original pattern of the mask layout includes the oblique edge (S210).

In further detail, performing grid snapping for the oblique edge (S210) may include creating divisional points for the oblique edge, and shifting, onto the reference points GP, those not disposed on the reference points GP from among the divisional points. Performing grid snapping for the oblique edge (S210) will be described below in detail.

Referring to FIG. 5, opposite ends of the first edge S1 may be the first vertex 1 and the second vertex 2, opposite ends of the second edge S2 may be the second vertex 2 and the third vertex 3, and opposite ends of the third edge S3 may be the third vertex 3 and the fourth vertex 4.

In the original pattern 10, each of the first edge S1 and the third edge S3 is an oblique edge that does not form 0 degrees, 45 degrees, or 90 degrees with respect to the reference line RF. That is, the first edge does not form 0 degrees, does not form 45 degrees, and does not form 90 degrees with respect to the reference line RF. Likewise, the first edge does not form 0 degrees, does not form 45 degrees, and does not form 90 degrees with respect to the reference line RF.

Referring to FIGS. 3 and 5, in order to perform grid snapping for the oblique edge (S210), a divisional point (for division of the oblique edge of the original pattern) may be created (S211). For example, after one of opposite ends of the oblique edge is designated as a start point, and the other of the opposite ends of the oblique edge is designated as an end point, a divisional point may be created on the oblique edge in order to create a segment having a predetermined length from the start point.

For example, for the first edge S1, which is an oblique edge, the first vertex 1 may be designated as a start point, and the second vertex 2 may be designated as an end point. A first divisional point D1 may be created on the first edge S1, for creation of a segment having a predetermined length from the first vertex 1.

Opposite ends of the segment may correspond to the first vertex 1 and the first divisional point D1. For example, the predetermined length of the segment may be optionally set by the user or may be determined in accordance with conditions, such as pattern size, pattern spacing, etc., taken into consideration for execution of optical proximity correction (OPC).

After creation of the divisional point D1, whether or not the created divisional point D1 overlaps with one of the reference points GP may be discriminated (S212). Aspects of this discrimination are described below in detail.

Overlap of the divisional point D1 with the reference point GP may mean that the center of the divisional point D1 overlaps with the center of the reference point GP.

Figure 6:
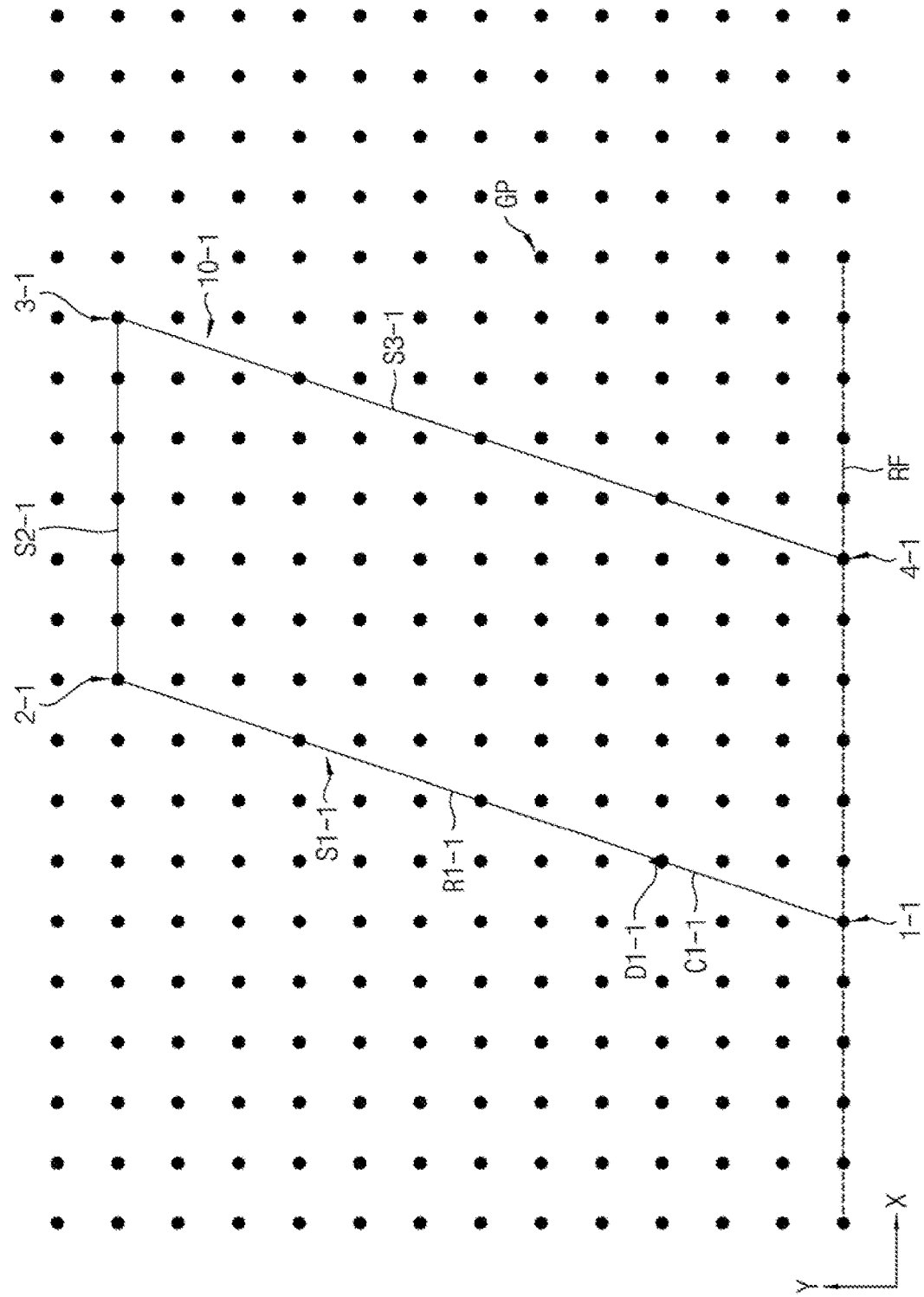

Referring to FIGS. 3 and 6, in an example embodiment, when the divisional point D1 overlaps with one of the reference points GP (that is, when the position of the divisional point is identical to the position of one of the reference points GP), a correction edge and a residual edge may be distinguished from each other with reference to the divisional point (S214).

For example, an original pattern 10-1 of a mask layout may include a first edge S1-1, a second edge S2-1, and a third edge S3-1. The original pattern 10-1 may include a first vertex 1-1, a second vertex 2-1, a third vertex 3-1, and a fourth vertex 4-1. A first divisional point D1-1, which overlaps with a reference point GP on the first edge S1-1, may be created. In this case, from the first edge S1-1, an edge C1-1 (which has the first vertex 1 and the first divisional point D1-1 as opposite ends thereof) may be determined as the correction edge, and an edge R1-1 (which has the first divisional point D1 and the second vertex 2 as opposite ends thereof) may be determined as the residual edge.

On the other hand, as discussed above with reference to FIG. 5, when the divisional point D1 does not overlap with the reference points GP, the correction edge and the residual edge may be created by grid-snapping the divisional point (S213). An example of this will now be described in detail.

In an example embodiment, creation of the correction edge and the residual edge through grid snapping of the divisional point D1 (i.e., when the divisional point D1 does not overlap with the reference points GP, as is the case in FIG. 5 for the edge S1) (S213) may include shifting the divisional point D1 to overlap with one of four reference points GP adjacent thereto, e.g., bounding the divisional point D1.

The four reference points GP adjacent to the divisional point D1 are reference points GP that form a quadrangle having a smallest size, from among quadrangles formed by reference points GP forming a grid shape, and are selected such that the divisional point D1 is disposed within the quadrangle formed by the four adjacent reference points GP.

The set of four reference points a1, a2, a3, and a4 may be selected such that, when the first to fourth reference points a1, a2, a3, and a4 are interconnected, a quadrangle having a smallest size (e.g., smallest area) is formed, from among quadrangles capable of being formed by reference points GP, and the first divisional point D1 is disposed within the quadrangle.

In an example embodiment, shifting the divisional point to overlap with an optional one of the four reference points a1, a2, a3, and a4 adjacent thereto may include shifting the divisional point to an optional one of the four reference points a1, a2, a3, and a4. The optional reference point may be selected by the user, or the optional reference point may be selected in accordance with a predetermined condition, etc.

Figure 7:
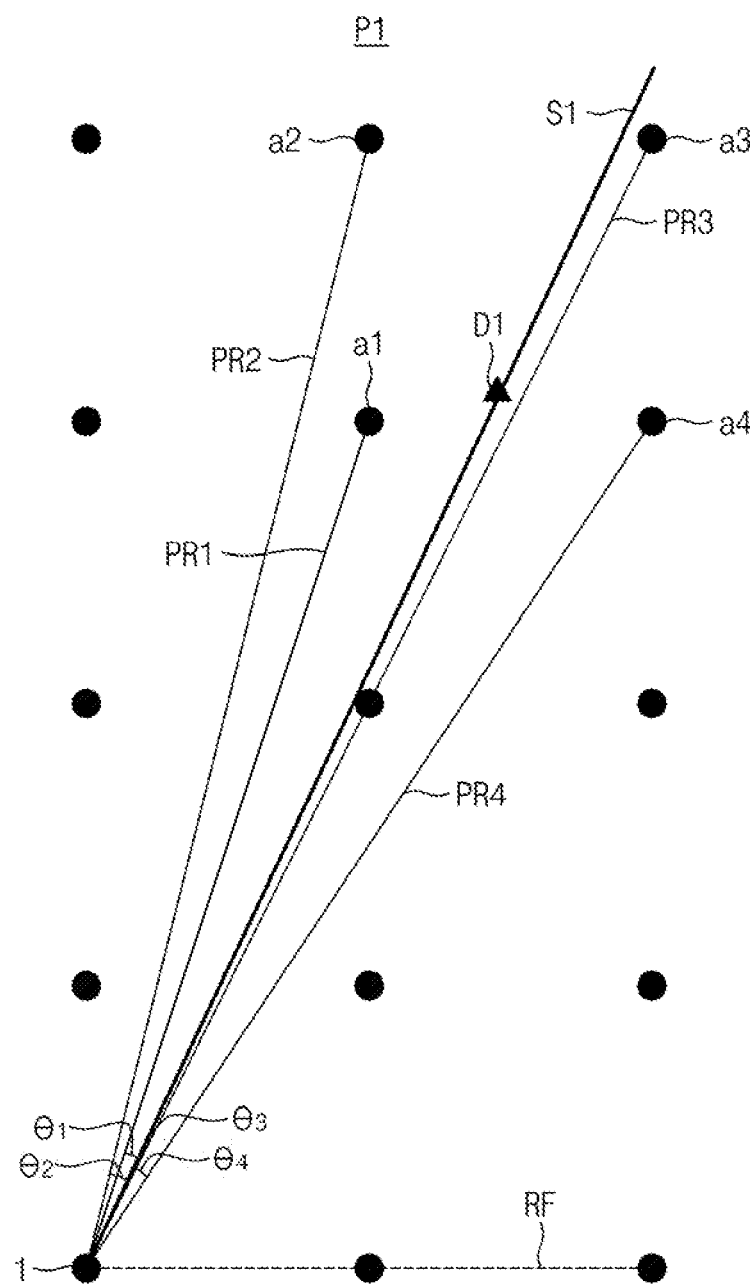

In an example embodiment, shifting the divisional point to overlap with one of the four reference points a1, a2, a3, and a4 adjacent thereto may be performed in accordance with the flowchart shown in FIG. 4, as will now be described in detail while also referring to FIG. 7. FIG. 7 is an enlarged view of a portion P1 of FIG. 5.

Referring to FIGS. 4 and 7, first to fourth preliminary lines may be created by connecting each of four reference points a1, a2, a3, and a4 around a divisional point D1 to a start point of an oblique edge (S213a). For example, a first preliminary line PR1 may be created by interconnecting the first vertex 1, which is the start point of the first edge S1 (which is an oblique edge), and the first reference point a1. Also, a second preliminary line PR2 may be created by interconnecting the first vertex 1 and the second reference point a2. Also, a third preliminary line PR3 may be created by interconnecting the first vertex 1 and the third reference point a3. Also, a fourth preliminary line PR4 may be created by interconnecting the first vertex 1 and the fourth reference point a4.

Next, respective angles that are formed by respective ones of the first to fourth preliminary lines PR1, PR2, PR3, and PR4 relative to the oblique edge (or the segment) may be calculated (S213b). For example, a first angle $\theta_1$ formed by the first edge S1 (which is the oblique edge) and the first preliminary line PR1 may be calculated. Also, a second angle $\theta_2$ formed by the first edge S1 and the second preliminary line PR2 may be calculated. Also, a third angle $\theta_3$ formed by the first edge S1 and the third preliminary line PR3 may be calculated. Also, a fourth angle $\theta_4$ formed by the first edge S1 and the fourth preliminary line PR4 may be calculated.

Calculation of an angle formed by a preliminary line and an oblique edge may include calculating an angle of the preliminary line with respect to the reference line RF using lengths of two sides forming a right angle in a right triangle having the preliminary line as an oblique side thereof, calculating an angle of the oblique edge with respect to the reference line RF using lengths of two sides forming a right angle in a right triangle having the oblique edge as an oblique side thereof, and calculating a difference between the angle of the preliminary line with respect to the reference line RF and the angle of the oblique edge with respect to the reference line RF.

Calculation of the angle of the preliminary line with respect to the reference line RF using the lengths of the two sides forming the right angle in the right triangle having the preliminary line as the oblique side thereof may be achieved in accordance with the following Expression 1:

$$\theta_P = \tan^{-1}\frac{\Delta y}{\Delta x} \qquad \text{[Expression 1]}$$

In Expression 1, $\Delta x$ means the length of the side parallel to the reference line RF from among the two sides forming the right angle in the right triangle, and $\Delta y$ means the length of the side perpendicular to the reference line RF in the two sides forming the right angle in the right triangle. Since all of opposite ends of the oblique edge and the preliminary lines are disposed on reference points GP, $\Delta x$ and $\Delta y$ may be easily derived.

Calculation of the angle of the oblique edge with respect to the reference line RF using the lengths of the two sides forming the right angle in the right triangle may be performed in the same manner as derivation of the angle of the preliminary line.

For example, derivation of the first angle $\theta_1$ formed by the first preliminary line PR1 and the first edge S1 may be achieved as follows. Calculation of an angle $\theta_{PR1}$ of the first preliminary line PR1 with respect to the reference line RF using lengths of two sides forming a right angle in a right triangle having the first preliminary line PR1 as an oblique side thereof may be achieved in accordance with the following Expression 2.

$$\theta_{PR1} = \tan^{-1}\frac{3}{1} \qquad \text{[Expression 2]}$$

Calculation of an angle $\theta_{S1}$ of the first edge S1 with respect to the reference line RF using lengths of two sides forming a right angle in a right triangle having the first edge S1 as an oblique side thereof may be achieved in accordance with the following Expression 3.

$$\theta_{S1} = \tan^{-1}\frac{12}{5} \qquad \text{[Expression 3]}$$

The first angle $\theta_1$ formed by the first preliminary line PR1 and the first edge S1 may be calculated by calculating a difference between the angle $\theta_{PR1}$ of the first preliminary line PR1 with respect to the reference line RF calculated as described above and the angle $\theta_{S1}$ of the first edge S1 with respect to the reference line RF calculated as described above. The second to fourth angles $\theta_2$, $\theta_3$ and $\theta_4$ may be calculated in the same manner as described above.

Referring again to FIGS. 4, 7, and 8, the divisional point may be shifted to the reference point (i.e., one of a1, a2, a3, and a4) of the preliminary line that has the smallest angle difference from the oblique edge, from among the four reference points a1, a2, a3, and a4 (S213c).

For example, from among the first to fourth angles $\theta_1$, $\theta_2$, $\theta_3$, and $\theta_4$, the third angle $\theta_3$ may be smallest. Thus, the third preliminary line PR3 may the preliminary line that forms the smallest angle with respect the first edge S1 (which is an oblique edge), from among the first to fourth preliminary lines PR1, PR2, PR3 and PR4.

In this case, the first divisional point D1 may be shifted to the third reference point a3 constituting the third preliminary line PR3. That is, the first divisional point D1 may be overlapped with the third reference point a3.

The divisional point shifted to the third reference point a3, i.e., a divisional point D1', may be referred to as a varied divisional point (or a first varied divisional point).

Figure 8:
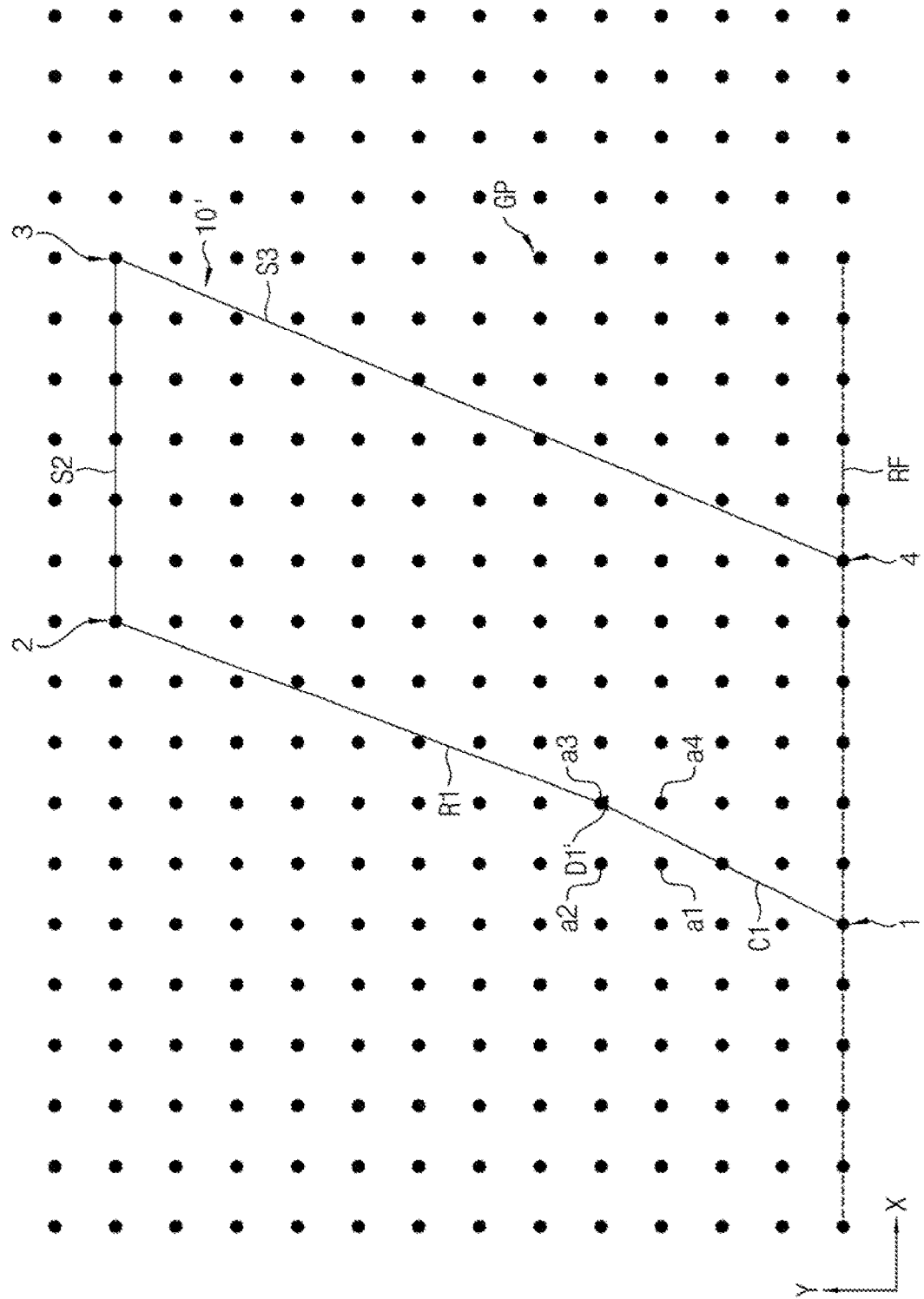

A correction edge may be created by interconnecting the start point of the oblique edge and the varied divisional point, and a residual edge may be created by interconnecting the varied divisional point and the end point of the oblique edge (S213d). See FIG. 8, showing a first correction edge C1 and a first residual edge R1 (described in additional detail below).

For example, the first correction edge C1 may be created by interconnecting the first vertex 1, i.e., the start point of the first edge S1 (which is an oblique edge) and the varied divisional point D1'. The first residual edge R1 may be created by interconnecting the varied divisional point D1' and the second vertex 2, i.e., the end point of the first edge S1.

Again referring to FIG. 3, whether or not the number of created divisional points corresponds to a predetermined number may be discriminated (S215). Alternatively, whether or not the number of all created edges corresponds to a predetermined number may be discriminated. The number of all created edges may mean the total number of correction edges and residual edges. In an example embodiment, when the predetermined number of all edges is n, the predetermined number of divisional points may be n−1.

In an example embodiment, when the number of created divisional points corresponds to the predetermined number, grid snapping for the oblique edge associated with the created divisional points may be completed.

For example, referring to FIG. 8, when the predetermined number of divisional points is 1, this means that one varied divisional point D1' has been created and, as such, grid snapping for the first edge S1 may be completed. Alternatively, when the predetermined number of all edges is two, this means that the first correction edge C1 and the first residual edge R1 have been created and, as such, grid snapping for the first edge S1 may be completed.

Although, for convenience of description, grid snapping has been described only for the first edge S1 in accordance with the flowchart shown in FIG. 3, grid snapping may also be performed for the third edge S3 before or after grid snapping for the first edge S1, or simultaneously with grid snapping for the first edge S1.

When grid snapping for all oblique edges included in the original pattern (which is included in the mask layout) is completed, a first corrected layout (for example, including a corrected pattern 10' of FIG. 8) may be created.

Referring to FIG. 3, in an example embodiment, if the number of created divisional points does not correspond to the predetermined number, then the flowchart of FIG. 3 may be repeated until the number of created divisional points corresponds to the predetermined number. That is, the process may include repetition of: creating a divisional point dividing the residual edge (S211) until the number of created divisional points corresponds to the predetermined number (S215), discriminating whether or not the divisional point dividing the residual edge overlaps with one of the reference points GP (S212), and creating (or distinguishing) a correction edge and a residual edge in accordance with whether or not the divisional point dividing the residual edge overlaps with one of the reference points GP (S213 and S214).

Figure 9:
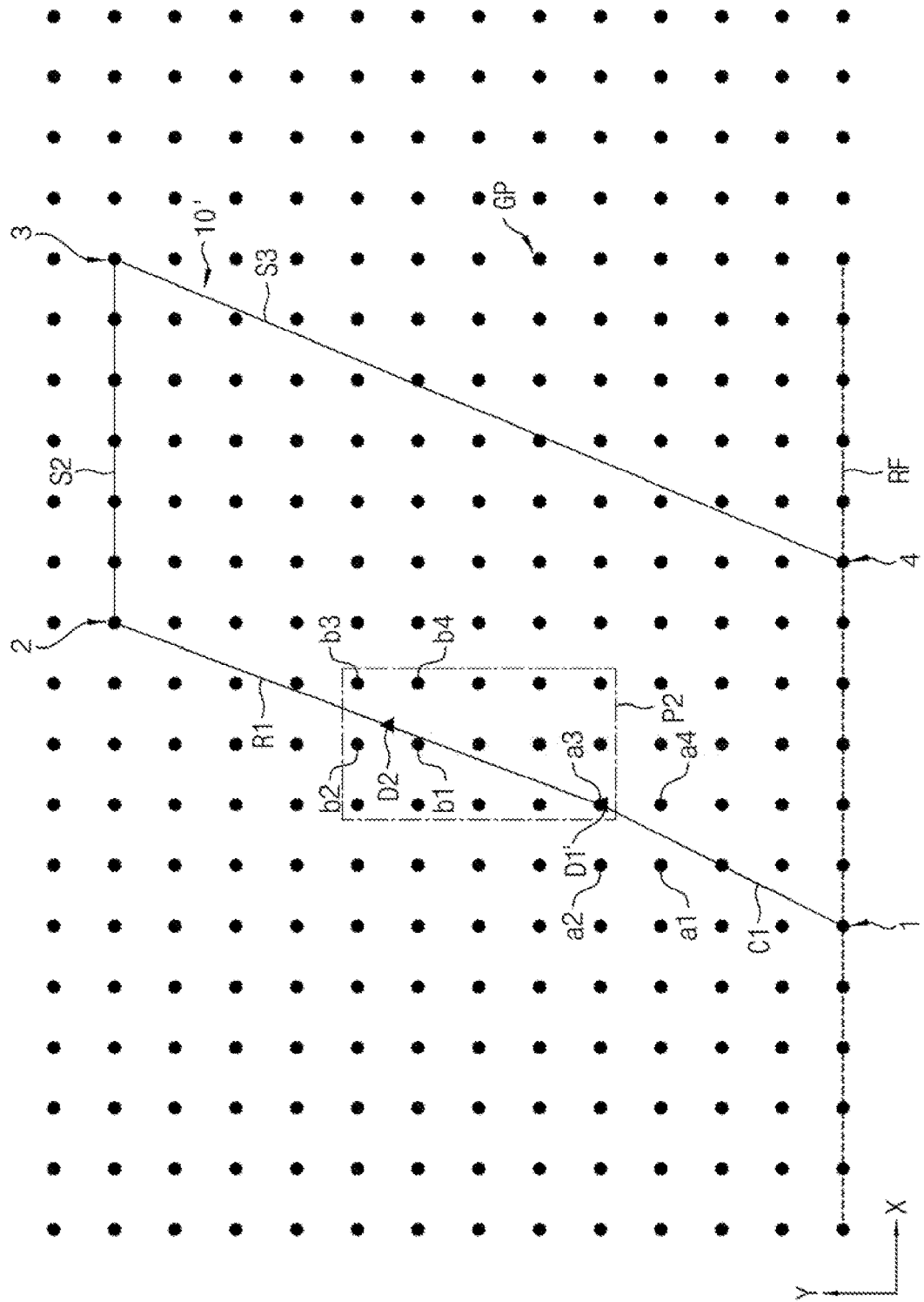

Referring to FIGS. 3 and 9, creating a divisional point for the residual edge when the number of created divisional points does not correspond to the predetermined number (S211) may include designating one of opposite ends of the residual edge as a start point while designating the other of the opposite ends of the residual edge as an end point, and then creating a divisional point on the residual edge such that a segment having a predetermined length from the start point is created. Here, the start point of the residual edge may be designated as a varied divisional point (a first varied divisional point) just previously created.

For example, for the first residual edge R1, the first varied divisional point D1' may be designated as the start point, and the second vertex 2 may be designated as the end point. A second divisional point D2 may be created on the first residual edge R1 such that a segment having a predetermined length from the first varied divisional point D1' is created. Opposite ends of the segment may be the first varied divisional point D1' and the second divisional point D2. The length of the segment may be equal to or different from the length of the segment created by the first vertex 1 and the first divisional point D1 in FIG. 5. For example, the length of the segment may be determined in accordance with the length of the first residual edge R1, the predetermined number of divisional points, etc.

Figure 10:
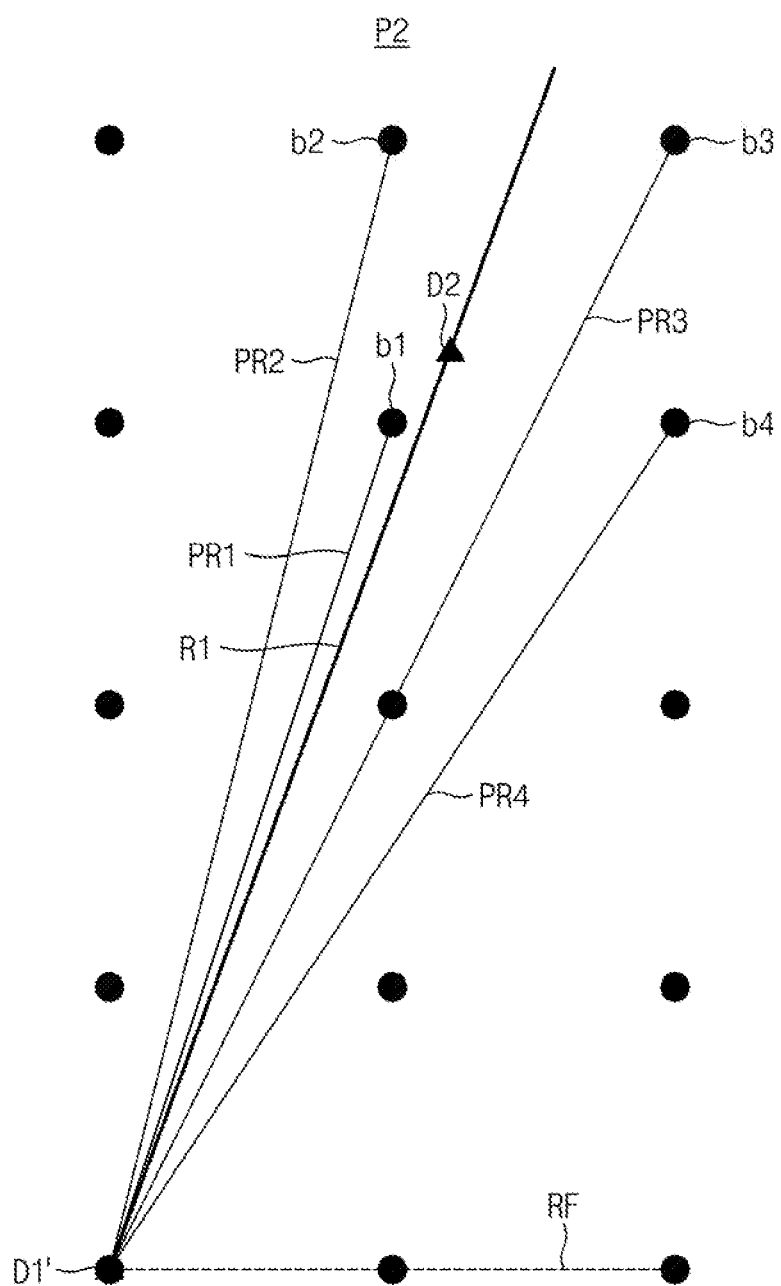

FIG. 10 is an enlarged view of a portion P2 of FIG. 9.

Referring to FIGS. 4 and 10, first to fourth preliminary lines may be created by connecting each of four reference points around a divisional point to the start point of the residual edge (S213a). For example, a first preliminary line PR1 may be created by interconnecting the first varied divisional point D1', (which is the start point of the first residual edge R1) and a first reference point b1. Also, a second preliminary line PR2 may be created by interconnecting the first varied divisional point D1' and a second reference point b2. Also, a third preliminary line PR3 may be created by interconnecting the first varied divisional point D1' and a third reference point b3. Also, a fourth preliminary line PR4 may be created by interconnecting the first varied divisional point D1' and a fourth reference point b4.

Angles respectively formed by the first to fourth preliminary lines PR1, PR2, PR3, and PR4 and the first residual edge (or the segment) may be calculated (S213b). For example, a first angle formed by the first residual edge R1 and the first preliminary line PR1 may be calculated. Also, a second angle formed by the first residual edge R1 and the second preliminary line PR2 may be calculated. Also, a third angle formed by the first residual edge R1 and the third preliminary line PR3 may be calculated. Also, a fourth angle formed by the first residual edge R1 and the fourth preliminary line PR4 may be calculated. Calculation of the first to fourth angles may be performed in the same manner as derivation of the first to fourth angles $\theta_1$, $\theta_2$, $\theta_3$, and $\theta_4$ described with reference to FIG. 7.

Figure 11:
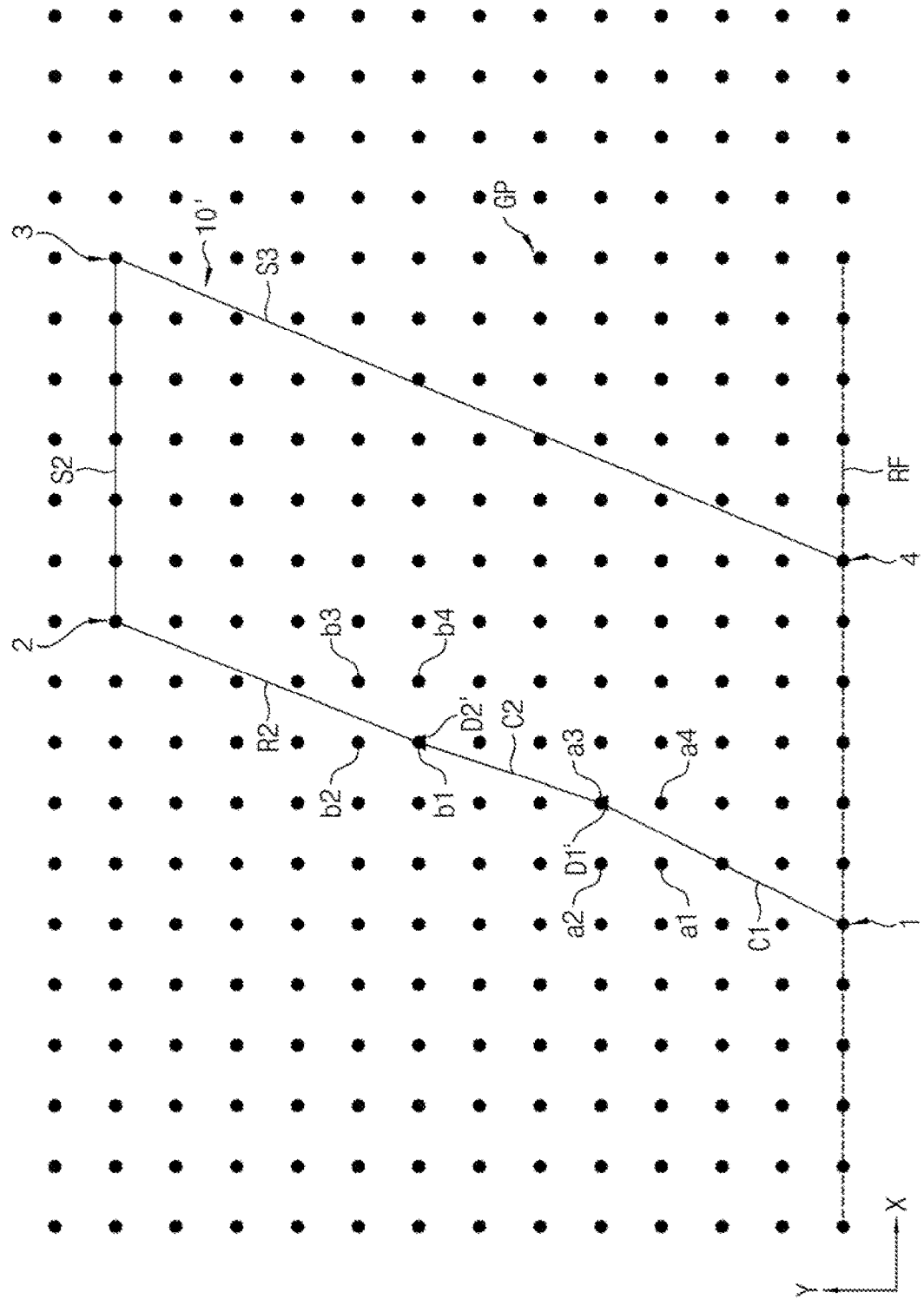

Referring to FIGS. 4, 10, and 11, the divisional point may be shifted to the reference point (i.e., one of b1, b2, b3, and b4) of the preliminary line that has the smallest angle difference from the residual edge, from among the four reference points (S213c). For example, from among the first to fourth angles respectively formed by the first to four preliminary lines PR1, PR2, PR3, and PR4 with respect to the first residual edge R1, the first angle formed by the first preliminary line PR1 and the first residual edge R1 may be the smallest. In this case, the second divisional point D2 may be shifted to the first reference point b1 constituting the first preliminary line PR1. That is, the second divisional point D2 may be overlapped with the first reference point b1, as shown in FIG. 11. The divisional point shifted to the first reference point b1, i.e., a divisional point D2', may be referred to as a varied divisional point (or a second varied divisional point).

A correction edge may be created by interconnecting the start point of the residual edge and the varied divisional point, and a new residual edge may be created by interconnecting the varied divisional point and the end point of the residual edge (S213d). For example, a second correction edge C2 may be created by interconnecting the start point of the first residual edge R1 (that is, the first varied divisional point D1') and the second varied divisional point D2'. A second residual edge R2 may be created by interconnecting the second varied divisional point D2' and the second vertex 2, i.e., the end point of the first residual edge R1. See FIG. 11.

Again referring to FIG. 3, whether or not the number of created divisional points corresponds to a predetermined number may be discriminated (S215). In an example embodiment, when the number of created divisional points corresponds to the predetermined number, grid snapping for the oblique edge (the residual edge) associated with the created divisional points may be completed. Referring to FIG. 11, for example, when the predetermined number of divisional points is 2, this means that two varied divisional points D1' and D2' have been created and, as such, grid snapping for the first edge S1 may be completed.

When grid snapping for all oblique edges included in the original pattern (which is included in the mask layout) is completed, a first corrected layout may be created.

Figure 12:
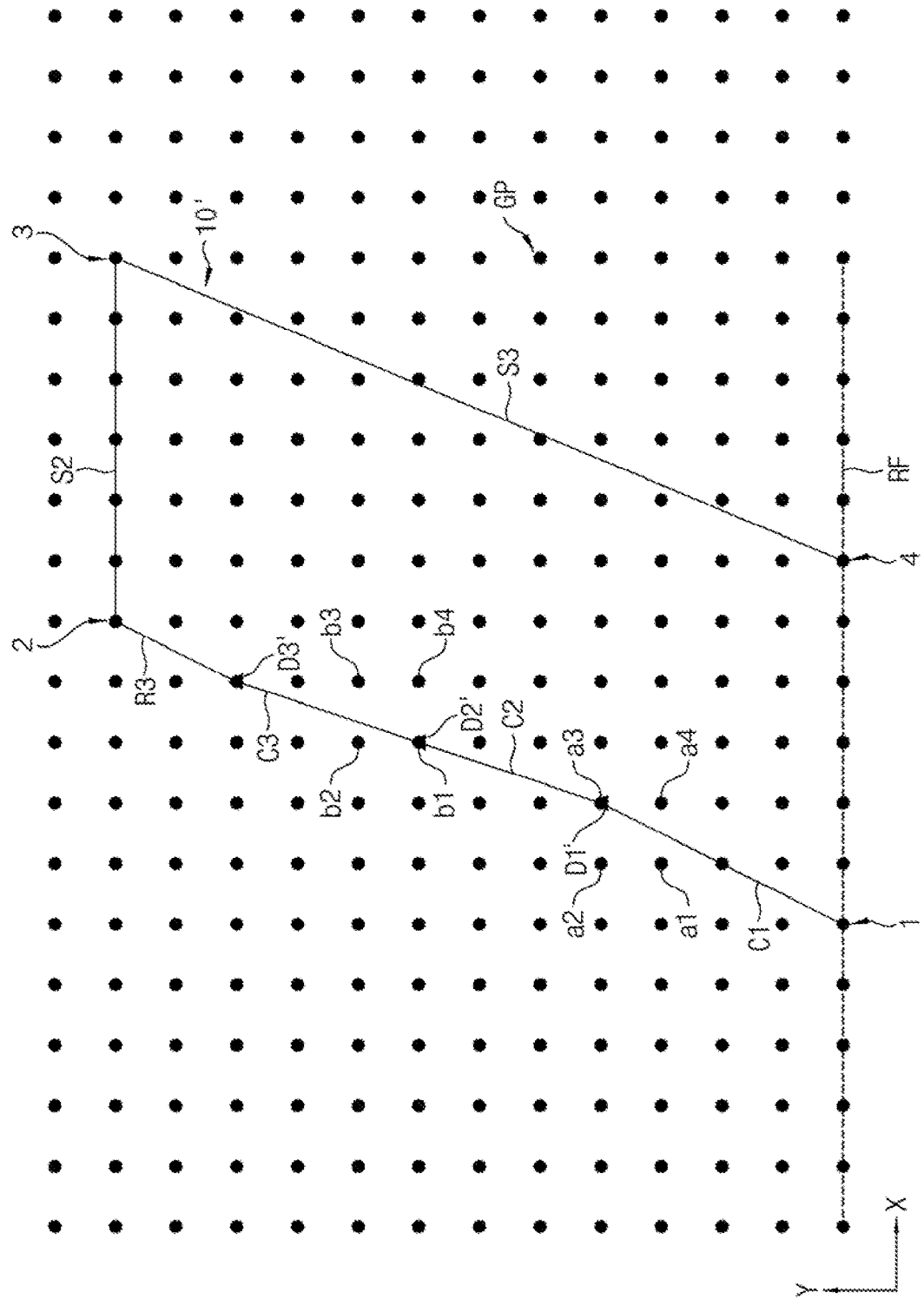

In an example embodiment, if the number of created divisional points does not correspond to the predetermined number (S215), then operations S211, S212 and S213 or operations S211, S212 and S214 may be again performed. Referring to FIGS. 3, 11 and 12, for example, when the number of created divisional points does not correspond to the predetermined number, operations S211, S212 and S213 may be performed for the second residual edge R2, thereby creating a varied divisional point D3' and creating a third correction edge C3 and a third residual edge R2.

Figure 13:
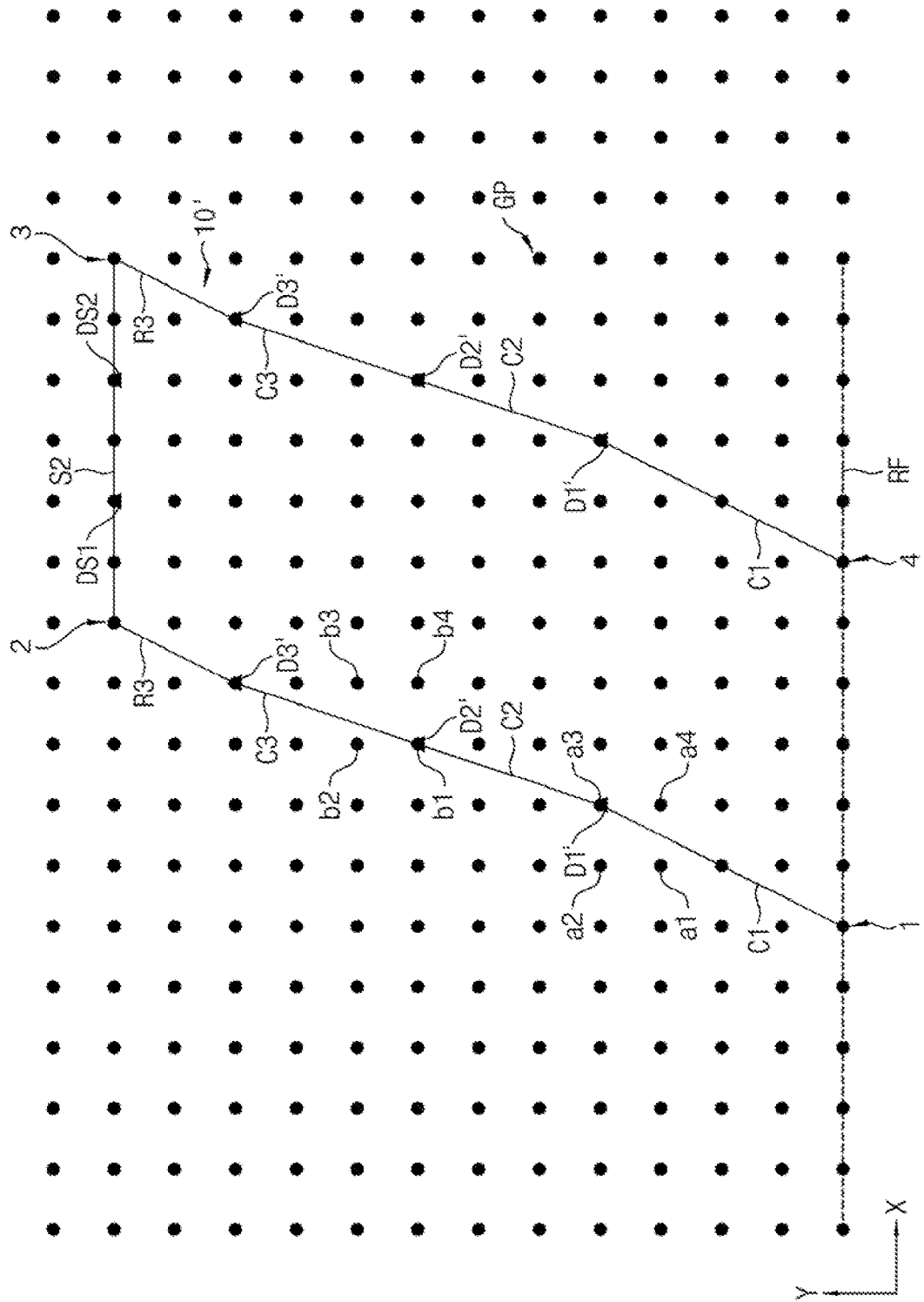

FIG. 13 shows that grid snapping has also been completed for the third edge S3. When grid snapping for all oblique edges included in the original pattern 10 is completed, a first corrected layout may be created. For example, as a corrected pattern 10' is created in accordance with completion of grid snapping for oblique edges (the first edge S1 and the third edge S3), as shown in FIG. 13, a first corrected layout including a corrected pattern 10' may be created.

In an example embodiment, creation of the first corrected layout (S210) may further include creating divisional points for edges other than an oblique edge, e.g., nonoblique edges. Here, edges other than an oblique edge, e.g., nonoblique edges, may mean edges forming 0 degrees, 45 degrees, or 90 degrees with respect to the reference line RF. For example, in the case of FIG. 13, divisional points DS1 and DS2 may be created for the second edge S2. In an example embodiment, the divisional points DS1 and DS2 may be disposed on reference points GP.

Figure 14:
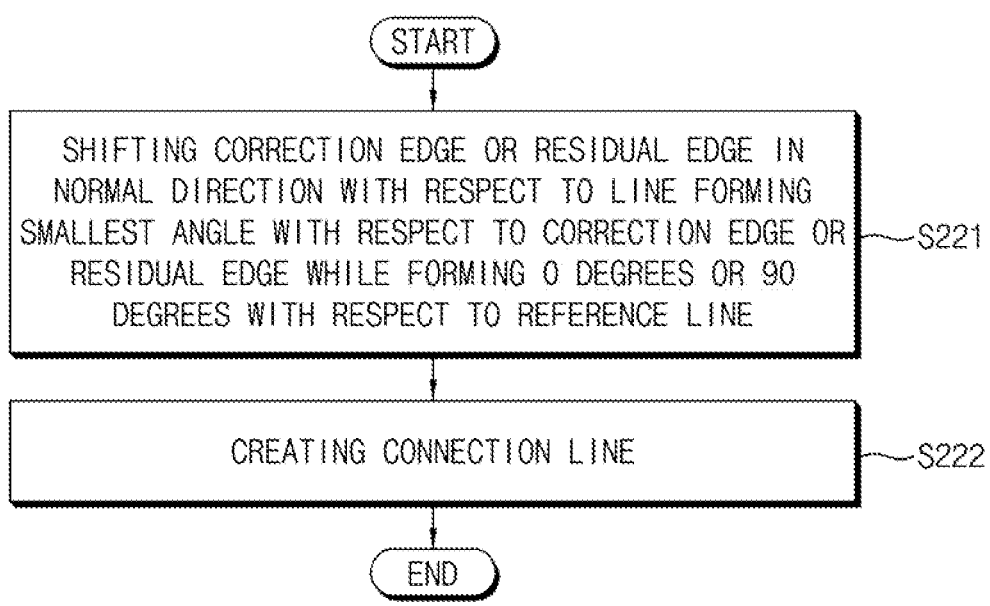
FIG. 14 is a flowchart explaining operation S220 of FIG. 2.

FIG. 14 is a flowchart explaining operation S220 of FIG. 2. FIGS. 15 to 19 are concept diagrams explaining operation of FIG. 14.

Referring to FIGS. 2 and 14, after creation of the first corrected layout (S210), a second corrected layout may be created through optical proximity correction (OPC) for the first corrected layout (S220). Creation of the second corrected layout through optical proximity correction (OPC) for the first corrected layout (S220) may include shifting a correction edge or a residual edge in a normal direction with respect to a line forming the smallest angle with respect to the correction edge or the residual edge while forming 0 degrees or 90 degrees with respect to the reference line (S221), and creating a connection line (S222).

Shifting the correction edge or the residual edge (S221) may mean shifting the correction edge or the residual edge under the condition that opposite ends of the correction edge or the residual edge are disposed on reference points GP. That is, the opposite ends of the correction edge or the residual edge may be disposed on reference points GP in spite of shift thereof through optical proximity correction (OPC). In addition, the correction edge or the residual edge may be shifted under the condition that the angle thereof with respect to the reference line RF is maintained.

Figure 15:
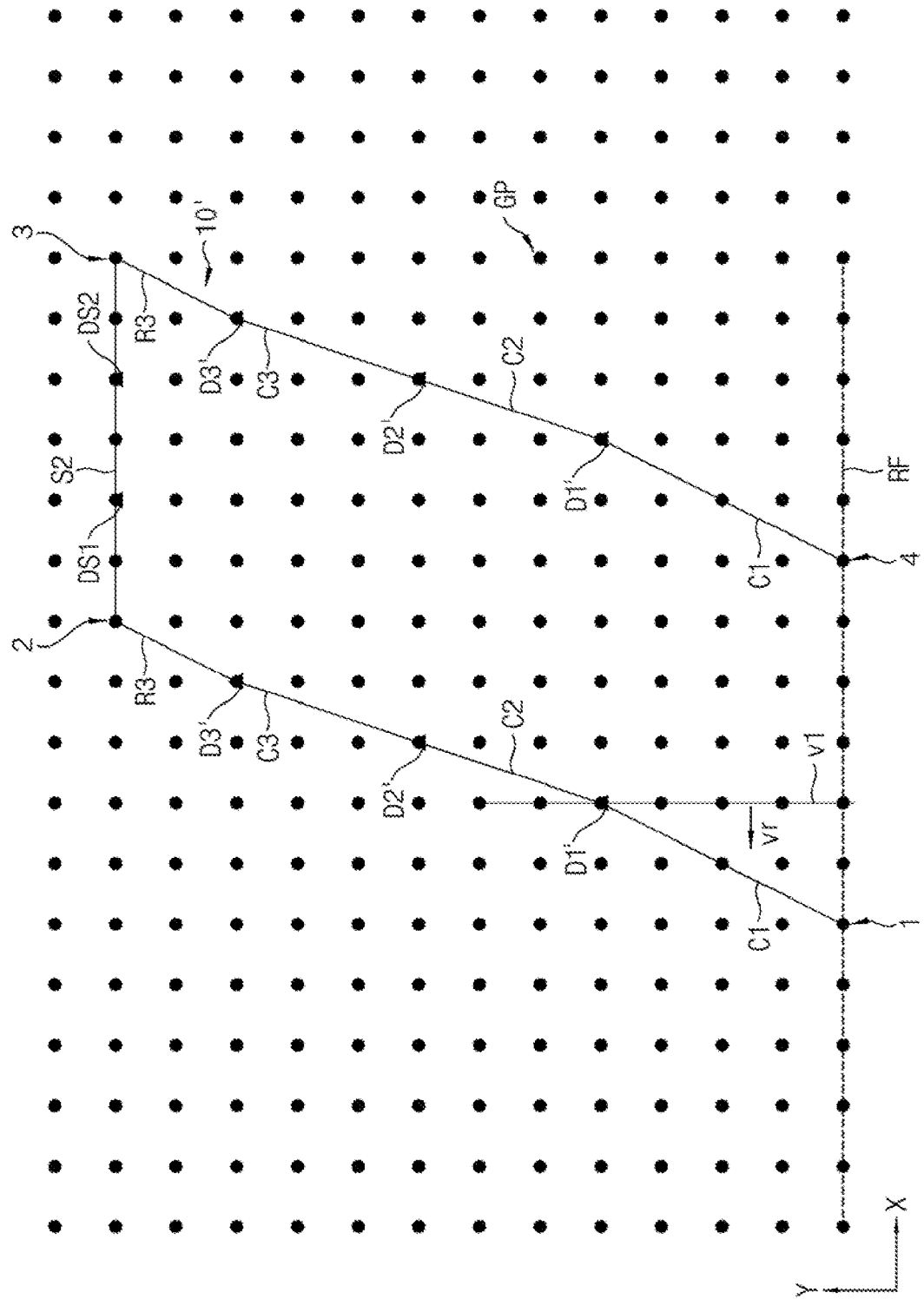
FIGS. 15 to 19 are concept diagrams explaining operation of FIG. 14.
Figure 16:
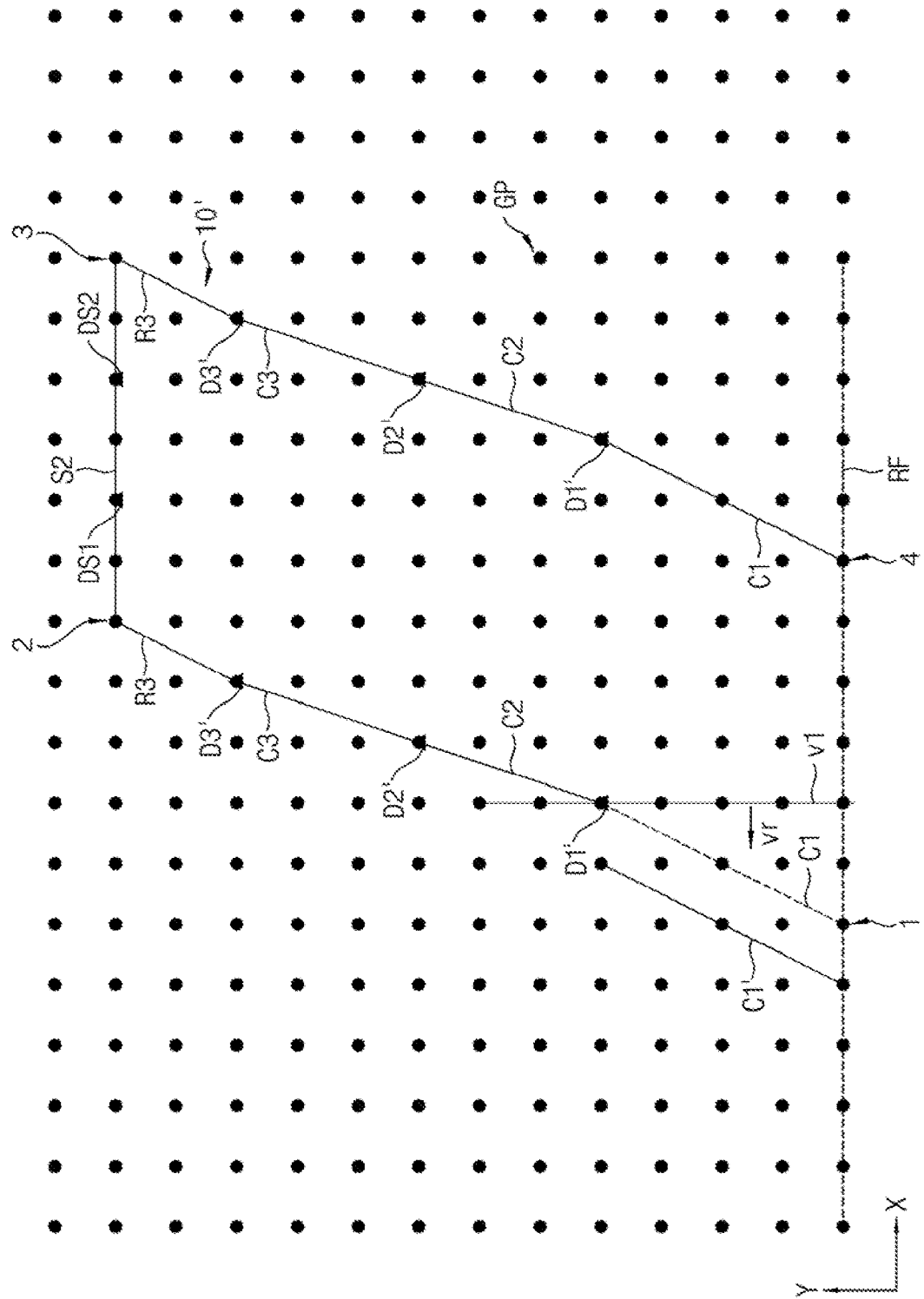

Referring to FIGS. 15 and 16, for example, performing optical proximity correction (OPC) for the first corrected layout including the corrected pattern 10' may include shifting the first correction edge C1 edge in a normal direction vr with respect to a first line v1 forming the smallest angle with respect to the first correction edge C1 while forming 0 degrees or 90 degrees with respect to the reference line RF, thereby creating a first shifted correction edge C1'. Opposite ends of the first shifted correction edge C1' may be disposed on reference points GP.

The distance by which the first correction edge C1 is shifted may be determined in accordance with an error generated when a mask is fabricated using a mask layout, for which no optical proximity correction (OPC) is performed (and, as such, patterns of the mask layout may be incorrectly transferred onto a wafer).

Although the first correction edge C1 is shown in FIG. 16 as being shifted by a minimum distance between reference points GP, this may be varied.

The first correction edge C1 is shifted while maintaining the angle thereof. Thus, the first correction edge C1 and the first shifted correction edge C1' may be parallel.

Figure 17:
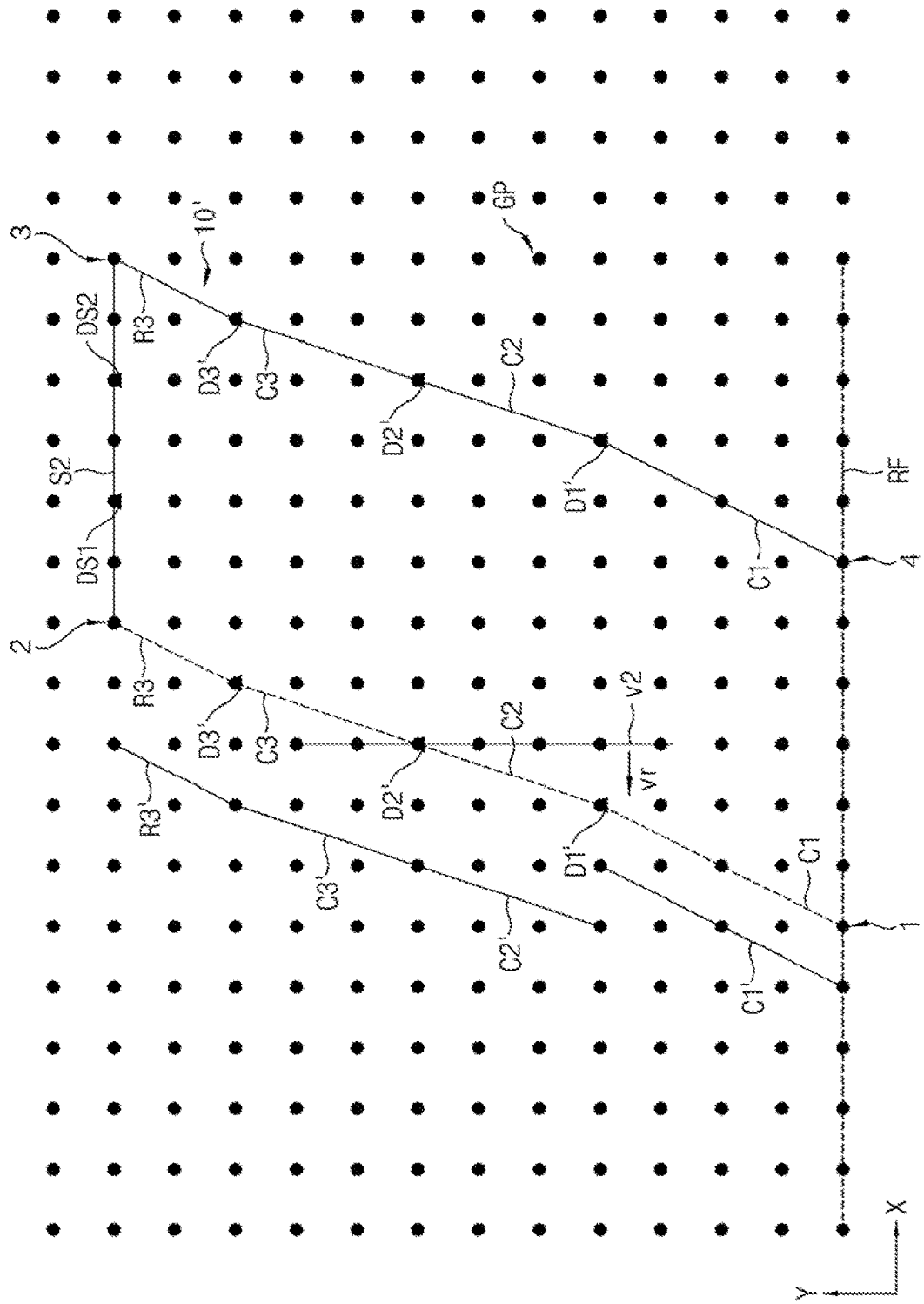

FIG. 17 shows that a second correction edge C2, a third correction edge C3, and a third residual edge R3 are shifted in accordance with operation S221 of FIG. 14, thereby creating a second shifted correction edge C2', a third shifted correction edge C3', and a shifted residual edge R3'. For example, the second correction edge C2 may be shifted in the normal direction vr with respect to a second line v2 forming the smallest angle with respect to the second correction edge C2 while forming 0 degrees or 90 degrees with respect to the reference line RF and, as such, the second shifted correction edge C2' may be created.

Figure 18:
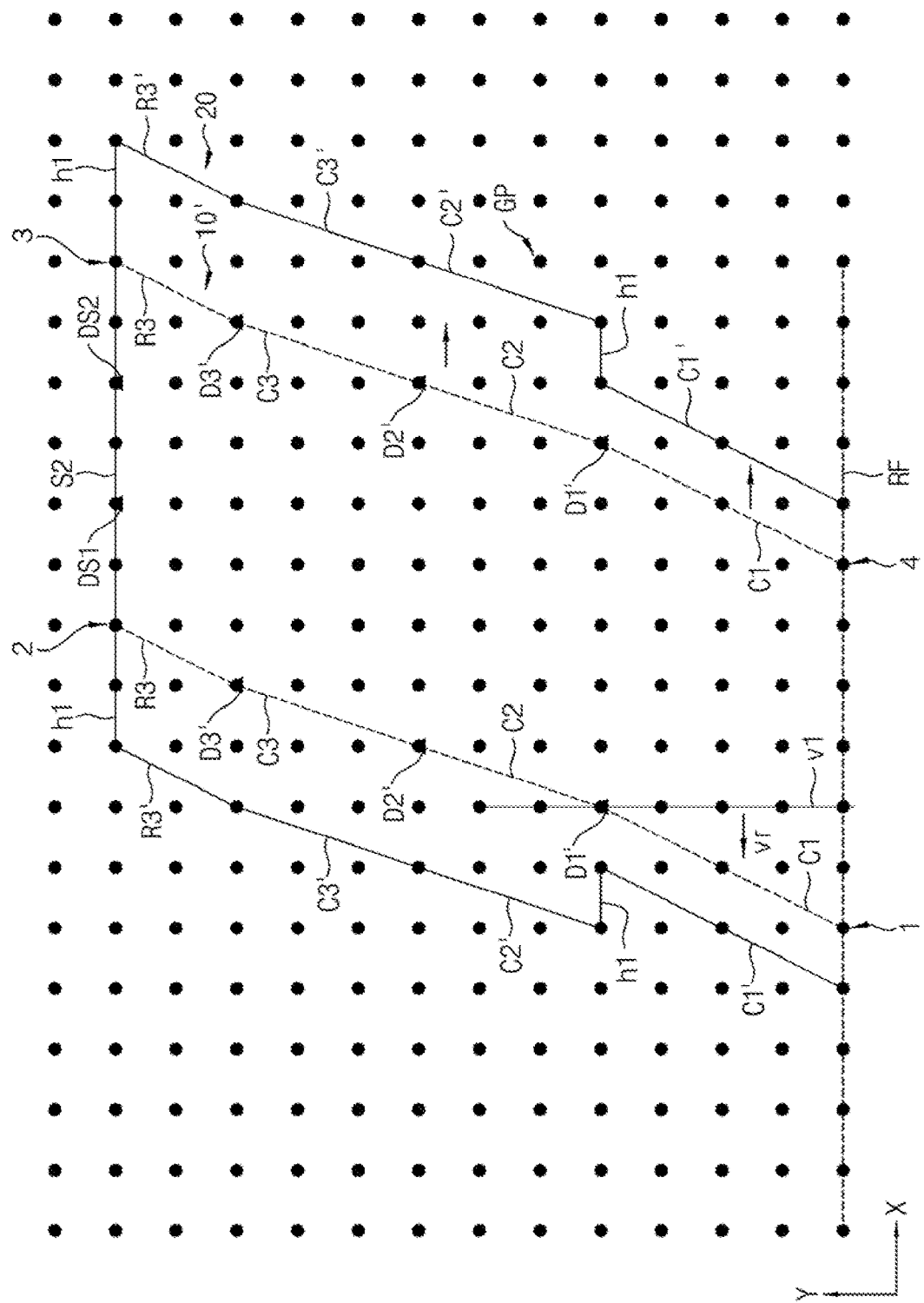

Referring to FIGS. 14, 17 and 18, a connection line may be created after completion of shift of the correction edges and the residual edges (S222). When shift distances among adjacent ones of the correction edges are different, the shifted correction edges may be spaced apart from one another without being interconnected. In addition, when shift distances among adjacent ones of the correction edges and the residual edges are different, the shifted correction edges and the shifted residual edges may be spaced apart from one another without being interconnected. For example, as shown in FIG. 17, the first shifted correction edge C1' and the second shifted correction edge C2' may be spaced apart from each other. In this case, a connection line h1, which interconnects the first shifted correction edge C1' and the second shifted correction edge C2', may be created. The connection line h1 may interconnect an end point of the first shifted correction edge C1' and a start point of the second shifted correction edge C2'. The connection line h1 may extend in a shift direction of the first correction edge C1 and a shift direction of the second correction edge C2.

In an example embodiment, after completion of shift of the residual edges, peripheral edges adjacent to the residual edges may be spaced apart from one another without being interconnected. For example, as shown in FIG. 17, the shifted residual edge R3' and the second edge S2 may be spaced apart from each other without being interconnected. In this case, as shown in FIG. 18, a connection line h1, which interconnects the shifted residual edge R3' and the second edge S2, may be created. The connection line h1 may interconnect an end point of the shifted residual edge R3' and a start point of the second edge S2 (that is, the second vertex 2). The connection line h1 may interconnect the end point of the shifted residual edge R3' and an end point of the second edge S2 (that is, the third vertex 3).

The corrected pattern 10' may be rendered in the form of a closed polygon in accordance with creation of the connection lines h1 (although, for convenience of illustration, the corrected pattern 10' is shown as being opened because a lower side of the corrected pattern 10' is not shown, the corrected pattern 10' may be a closed polygon in a state in which the entirety thereof is shown). A corrected pattern 20, which is a closed polygon, may be formed in accordance with creation of the connection lines h1 and, as such, a second corrected layout may be created.

Figure 19:
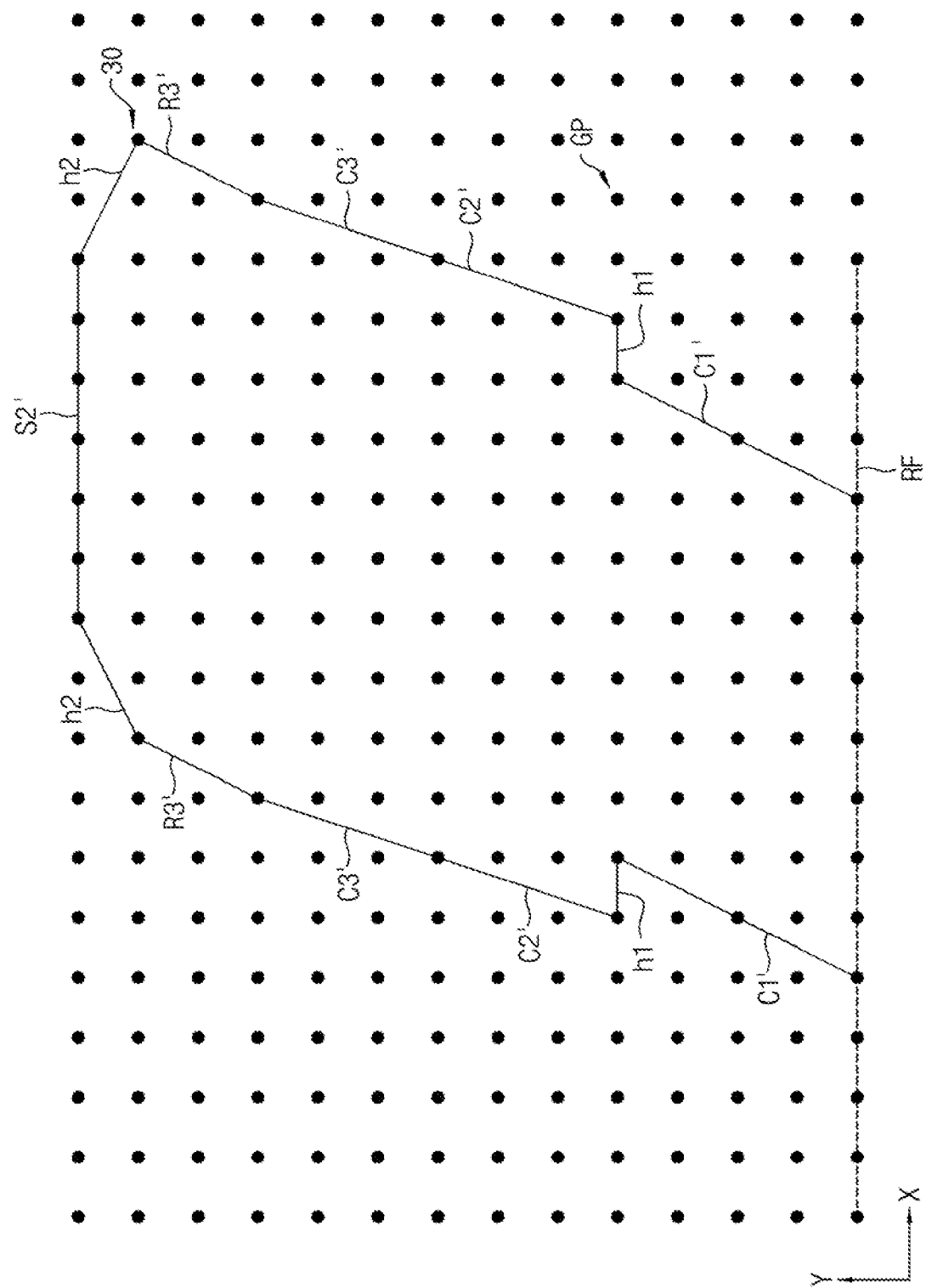

Referring to FIGS. 2, 17, and 19, creation of the second corrected layout through optical proximity correction (OPC) for the first corrected layout (S200) may further include shifting segments including edges other than an oblique edge. For example, the first segment having the second vertex 2 and the divisional point DS1 as the opposite ends thereof, the second segment having the divisional points DS1 and DS2 as the opposite ends thereof, and the third segment having the divisional point DS2 and the third vertex 3 as the opposite ends thereof may be shifted. For example, the first to third segments may be shifted in normal directions thereof, respectively. Although the segments of the second edge S2 are shown in FIG. 19 as being shifted by the same distance, thereby creating one shifted edge S2', one or more of the first to third segments may be shifted by a distance that is different from those of the remaining segments.

In an example embodiment, after correction edges and residual edges have been completely shifted, and after even segments included in edges other than an oblique edge have also been completely shifted, a connection line interconnecting a shifted edge (or a shifted segment) and a correction edge adjacent thereto or a residual edge adjacent thereto may be created when the shifted edge (or the shifted segment) and the correction edge adjacent thereto or the residual edge adjacent thereto are spaced apart from each other such that no closed polygon is formed. Alternatively, a connection line interconnecting segments adjacent to each other may be created when the adjacent segments are not interconnected such that no closed polygon is formed. By creation of the connection line, a closed polygon may be formed.

For example, referring to FIG. 19, when the shifted residual edge R3' and the shifted edge S2' are not interconnected, a connection line h2 may be created. In accordance with creation of the connection line h2, a closed polygon may be formed and, as such, a second corrected layout including a corrected pattern 30 may be created.

Note that the connection line h2 shown in FIG. 19 is merely illustrative, and diverse methods of interconnecting the shifted residual edge R3' and the shifted edge S2 may be employed. For example, the method of interconnecting the shifted residual edge R3' and the shifted edge S2 may be performed in accordance with a corner processing method used in a general optical proximity correction (OPC) method.

Again referring to FIG. 1, fabrication of the mask (S300) may include form the mask using the second corrected layout created through the above-described procedure.

In an example embodiment, the pattern layout design method may further include down-scaling the spacing of the reference points GP before performing optical proximity correction (OPC) for the mask layout (S200). For example, the spacing of the reference points GP may be determined in accordance with pattern size, pattern spacing, and/or the size of a segment created through division of an edge.

Figure 20:
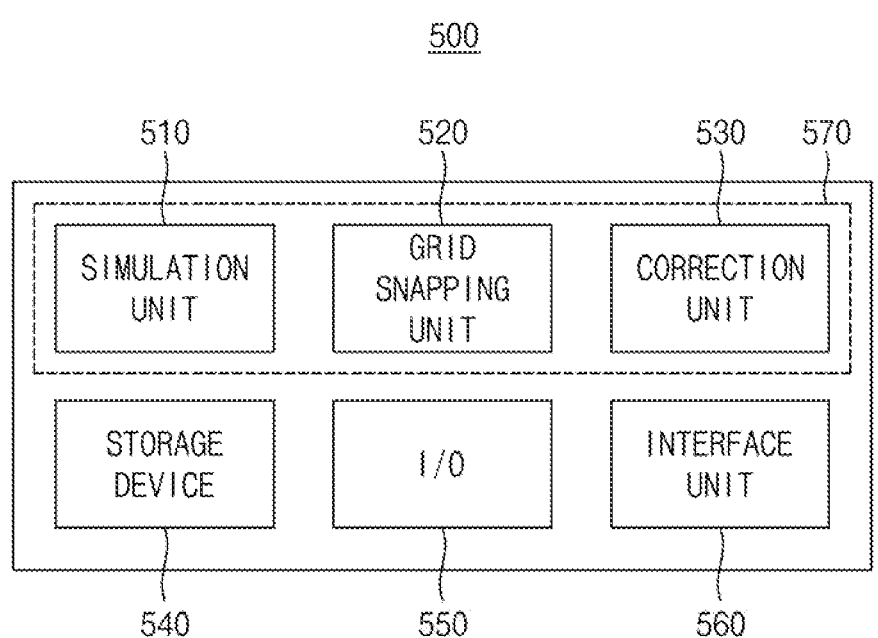
FIG. 20 is a schematic view showing a computer system for performing the pattern layout design method according to an example embodiment.

FIG. 20 is a schematic view showing a computer system for performing the pattern layout design method according to an example embodiment.

Referring to FIG. 20, a computer system 500 may include a controller 570 processing various data. In an example embodiment, the controller 570 may include a simulation unit 510, a grid snapping unit 520, and a correction unit 530. The simulation unit 510 may provide a pattern of a mask layout, a pattern of a first corrected layout, and/or a pattern of a second corrected layout on the grid layout including the reference points GP arranged in a grid. The grid snapping unit 520 may perform grid snapping for an oblique edge of the mask layout, thereby creating the first corrected layout. The correction unit 530 may create the second corrected layout through optical proximity correction (OPC) for the first corrected layout.

The computer system 500 may further include a storage device 540 capable of storing various data. The storage device 540 may include a hard disk and/or a non-volatile semiconductor memory device (for example, a flash memory device, a phase-change memory device and/or a magnetic memory device). The computer system 500 may further include an input/output unit (I/O) 550 and an interface unit 560. The input/output unit (I/O) 550 may include a keyboard, a keypad and/or a display device. Various data provided from the exterior may be transferred to the computer system 500 via the interface unit 560, and various data processed by the computer system 500 may be transferred to the exterior via the interface unit 560. The interface unit 560 may include a wired element, a wireless element and/or a universal serial bus (USB) port. The controller 570, the storage device 540, the input/output unit (I/O) 550, and the interface unit 560 may be coupled via a data bus.

As described above, in accordance with an example embodiment, even when an original pattern including a mask layout includes oblique edges (forming an angle other than 0 degrees, 45 degrees, or 90 degrees), a corrected layout enabling optical proximity correction (OPC) may be created. As such, an optical proximity correction (OPC) task may be performed through a computer program. The corrected layout may include correction edges created through minimum correction of the oblique edges of the original pattern.

As described above, embodiments may provide method for designing a layout of a pattern having an oblique edge. Embodiments may provide a method for manufacturing a semiconductor device using the pattern layout design method.

Embodiments may provide a method of manufacturing a semiconductor device, including performing optical proximity correction for a mask layout, thereby creating a corrected layout, fabricating a mask using the corrected layout, and manufacturing a semiconductor device using the mask, e.g., by forming a photoresist pattern on a substrate by using a photomask fabricated with the corrected layout. Creating the corrected layout may include, e.g., generating, by a hardware computer system, a first corrected layout of a mask layout, and generating, by the hardware computer system, second corrected layout using optical proximity correction on the first corrected layout.

An example embodiment is directed to a device that includes a processor and a memory, which stores executable instructions that, when executed by the processor, perform optical proximity correction for a mask layout to create a corrected layout according to an example embodiment.

An example embodiment is directed to a non-transitory machine-readable medium that includes executable instructions that, when executed by a hardware processor, perform optical proximity correction for a mask layout to create a corrected layout according to an example embodiment.

An example embodiment is directed to a method of manufacturing a lithographic mask, the method including performing optical proximity correction for a mask layout to create a corrected layout according to an example embodiment, and forming the lithographic mask using the corrected layout.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Further, embodiments may be implemented, e.g., in part, in a non-transitory machine-readable medium. Accordingly, it will be understood by those of skill in the art that various changes in form and details may be made without departing from the spirit and scope of the present invention as set forth in the following claims.

What is claimed is:

1. A pattern layout design method, comprising:
    creating a first corrected layout through grid snapping for an oblique edge of a mask layout designed on a grid layout, the grid layout including a plurality of reference points arranged in a grid; and
    performing optical proximity correction for the first corrected layout, thereby creating a second corrected layout,
    wherein the creating the first corrected layout includes:
        creating a first divisional point dividing the oblique edge,
        discriminating whether or not the first divisional point overlaps with one of the plurality of reference points,
        grid-snapping the first divisional point when the first divisional point does not overlap with any one of the plurality of reference points, thereby creating a first correction edge and a first residual edge,
        discriminating whether or not a number of created divisional points corresponds to a predetermined number,
        creating a second divisional point dividing the first residual edge when the number of created divisional points does not correspond to the predetermined number,
        discriminating whether or not the second divisional point overlaps with one of the plurality of reference points, and
        grid-snapping the second divisional point when the second divisional point does not overlap with any one of the plurality of reference points, thereby creating a second correction edge and a second residual edge.

2. The pattern layout design method as claimed in claim 1, wherein a start point and an end point of the oblique edge each overlap with a respective reference point from among the plurality of reference points.

3. The pattern layout design method as claimed in claim 2, wherein:
    in the grid layout, a reference line is defined to extend in a first direction while passing through ones of the plurality of reference points; and
    the oblique edge does not form 0 degrees, does not form 45 degrees, and does not form 90 degrees with respect to the reference line.

4. The pattern layout design method as claimed in claim 1, wherein the grid-snapping of the first divisional point includes:
    shifting the first divisional point to one reference point from among a set of four reference points from among the plurality of reference points, the set of four reference points being adjacent to the first divisional point.

5. The pattern layout design method as claimed in claim 4, wherein the grid-snapping of the first divisional point includes:
    respectively connecting ones of the set of four reference points to a start point of the oblique edge, to create first to fourth preliminary lines; and
    calculating angles respectively formed by the first to fourth preliminary lines with respect to the oblique edge.

6. The pattern layout design method as claimed in claim 5, wherein the shifting of the first divisional point to one reference point from among the set of four reference point includes:
    shifting the first divisional point to one reference point, from among the set of four reference points, corresponding to the preliminary line forming a smallest angle with respect to the oblique edge.

7. The pattern layout design method as claimed in claim 1, further comprising distinguishing a first correction edge and a first residual edge from each other with reference to the first divisional point when the first divisional point overlaps with one of the plurality of reference points.

8. The pattern layout design method as claimed in claim 7, wherein, when the number of created divisional points corresponds to the predetermined number, the first corrected layout is created, and the creating the second corrected layout is then performed, and the first corrected layout includes the first correction edge and the first residual edge.

9. The pattern layout design method as claimed in claim 8, wherein:
    in the grid layout, a reference line is defined to extend in a first direction while passing through ones of the plurality of reference points, and
    the creating of the second corrected layout includes:
        shifting the first correction edge in a normal direction with respect to a first line forming a smallest angle with respect to the first correction edge while forming 0 degrees or 90 degrees with respect to the reference line under a condition that the angle of the first correction edge is maintained; and
        shifting the first residual edge in a normal direction with respect to a second line forming a smallest angle with respect to the first residual edge while forming 0 degrees or 90 degrees with respect to the reference line under a condition that the angle of the first residual edge is maintained.

10. The pattern layout design method as claimed in claim 1, further comprising:
    distinguishing a second correction edge and a second residual edge from each other with reference to the second divisional point when the second divisional point overlaps with one of the plurality of reference points.

11. The pattern layout design method as claimed in claim 10, further comprising:
after creating or distinguishing the second correction edge and the second residual edge, discriminating whether or not a number of created divisional points corresponds to a predetermined number; and
creating a third divisional point dividing the second residual edge when the number of created divisional points does not correspond to the predetermined number.

12. The pattern layout design method as claimed in claim 11, wherein, when the number of created divisional points corresponds to the predetermined number, the first corrected layout is created, and the creating the second corrected layout is then performed, and the first corrected layout includes the first correction edge, the second correction edge, and the second residual edge.

13. The pattern layout design method as claimed in claim 11, further comprising:
discriminating whether or not the third divisional point overlaps with one of the plurality of reference points, and
grid-snapping the third divisional point when the third divisional point does not overlap with any one of the plurality of reference points, thereby creating a third correction edge and a third residual edge, and distinguishing the third correction edge and the third residual edge from each other with reference to the third divisional point when the third divisional point overlaps with one of the plurality of reference points.

14. The pattern layout design method as claimed in claim 13, further comprising:
after creating or distinguishing the third correction edge and the third residual edge, discriminating whether or not a number of created divisional points corresponds to a predetermined number; and
creating a fourth divisional point dividing the third residual edge when the number of created divisional points does not correspond to the predetermined number, and, when the number of created divisional points corresponds to the predetermined number, the first corrected layout is created, and the creating the second corrected layout is then performed, and the first corrected layout includes the first correction edge, the second correction edge, the third correction edge and the third residual edge.

15. The pattern layout design method as claimed in claim 1, wherein down-scaling for the plurality of reference points is performed before the creating the first corrected layout.

16. A pattern layout design method, comprising:
creating a first corrected layout through grid snapping for an oblique edge of a mask layout designed on a grid layout, the grid layout including a plurality of reference points arranged in a grid; and
performing optical proximity correction for the first corrected layout, thereby creating a second corrected layout,
wherein the creating the first corrected layout includes:
creating a divisional point dividing the oblique edge,
discriminating whether or not the divisional point overlaps with one of the plurality of reference points,
creating a correction edge and a residual edge in accordance with whether or not the divisional point overlaps with one of the plurality of reference points, and
repeating creating a divisional point dividing a residual edge, discriminating whether or not the divisional point dividing the residual edge overlaps with one of the plurality of reference points, and creating a correction edge and a residual edge in accordance with whether or not the divisional point dividing the residual edge overlaps with one of the plurality of reference points, until a number of created divisional points corresponds to a predetermined number, and
wherein the creating the correction edge and the residual edge includes
respectively connecting ones of a set of four reference points, which are among the plurality of reference points and adjacent to the divisional point, to a start point of the oblique edge, thereby creating first to fourth preliminary lines, when the divisional point does not overlap with any one of the plurality of reference points,
calculating angles respectively formed by the oblique edge with respect to the first to fourth preliminary lines, and
shifting the divisional point to one reference point, from among the set of four reference points, corresponding to the preliminary line that forms a smallest angle with respect to the oblique edge.

17. The pattern layout design method as claimed in claim 16, wherein the repeating of creating the correction edge and the residual edge includes:
respectively connecting, to a start point of the residual edge, one of a set of four reference points adjacent to the divisional point dividing the residual edge, thereby creating first to fourth preliminary lines, when the divisional point dividing the residual edge does not overlap with any one of the plurality of reference points,
calculating angles respectively formed by the first to fourth preliminary lines with respect to the residual edge, and
shifting the divisional point dividing the residual edge to one reference point, from among the set of four reference points, corresponding to the preliminary line that forms a smallest angle with respect to the residual edge.

18. The pattern layout design method as claimed in claim 17, wherein:
in the grid layout, a reference line is defined to extend in a first direction while passing through ones of the plurality of reference points, and
the creating of the second corrected layout includes:
shifting the correction edge in a normal direction with respect to a first line forming a smallest angle with respect to the correction edge while forming 0 degrees or 90 degrees with respect to the reference line under a condition that the angle of the correction edge with respect to the reference line is maintained; and
shifting the residual edge in a normal direction with respect to a second line forming a smallest angle with respect to the residual edge while forming 0 degrees or 90 degrees with respect to the reference line under a condition that the angle of the residual edge with respect to the reference line is maintained.

19. A semiconductor device manufacturing method, comprising:
designing a mask layout;
performing optical proximity correction for the mask layout, thereby creating a corrected layout;
fabricating a mask using the corrected layout; and
manufacturing a semiconductor device using the mask,
wherein the creating the corrected layout includes:

creating a first corrected layout through grid snapping for an oblique edge of a mask layout designed on a grid layout, the grid layout including reference points arranged in a grid, and performing optical proximity correction for the first corrected layout, thereby creating a second corrected layout, and wherein the creating the first corrected layout includes:

creating a first divisional point for the oblique edge or a residual edge, and shifting the first divisional point to one of the plurality of reference points that is among a set of four reference points that are adjacent to the first divisional point, thereby creating a first varied divisional point.

20. The semiconductor device manufacturing method as claimed in claim 19, further comprising:

creating a second divisional point for a residual edge having the first varied divisional point as a start point thereof; and shifting the second divisional point to one of the set of four reference points, thereby creating a second varied divisional point.

\* \* \* \* \*